United States Patent
Saito et al.

(10) Patent No.: US 7,414,947 B2
(45) Date of Patent: *Aug. 19, 2008

(54) OPTICAL PICKUP DEVICE, RECORDING AND REPRODUCING APPARATUS AND GAP DETECTION METHOD

(75) Inventors: Kimihiro Saito, Saitama (JP); Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/736,288

(22) Filed: Apr. 17, 2007

(65) Prior Publication Data

US 2007/0183298 A1    Aug. 9, 2007

Related U.S. Application Data

(63) Continuation of application No. 10/714,866, filed on Nov. 18, 2003, now Pat. No. 7,230,902.

(30) Foreign Application Priority Data

Nov. 25, 2002    (JP)    ............................. 2002-341378

(51) Int. Cl.
G11B 7/135    (2006.01)
(52) U.S. Cl. ............................. 369/110.02; 369/112.21; 369/112.23; 369/120
(58) Field of Classification Search ........................ None
See application file for complete search history.

(56) References Cited

U.S. PATENT DOCUMENTS

| 4,993,011 | A | 2/1991 | Torazawa et al. |
|---|---|---|---|
| 4,995,724 | A | 2/1991 | Sonobe et al. |
| 5,033,828 | A | 7/1991 | Haruta |
| 5,577,017 | A | 11/1996 | Yamamoto et al. |
| 6,298,026 | B1 | 10/2001 | Suzuki et al. |
| 6,473,385 | B1 | 10/2002 | Salto |
| 7,230,902 | B2 * | 6/2007 | Saito et al. ............. 369/110.02 |

FOREIGN PATENT DOCUMENTS

| EP | 1 031 976 A2 | 8/2000 |
|---|---|---|
| EP | 1 083 553 A2 | 3/2001 |
| WO | WO 99/41566 | 8/1999 |

* cited by examiner

*Primary Examiner*—Joseph Feild
*Assistant Examiner*—Joseph Haley
(74) *Attorney, Agent, or Firm*—Oblon, Spivak, McClelland, Maier & Neustadt, P.C.

(57)    ABSTRACT

An optical pickup device and an optical recording and reproducing apparatus are suitable for use with a near-field optical recording and reproducing system. An optical pickup device comprises an objective lens composed of a solid immersion lens (SIL) the objective lens having a numerical aperture greater than 1, a beam splitter configured to reflect both of a p-polarized light component and an s-polarized light component of reflected lights from an optical recording medium when the optical pickup device irradiates the optical recording medium with a bundle of rays in a predetermined polarized state from a light source through the objective lens, a divider configured to divide incident light into a p-polarized light component and an s-polarized light component reflected by the beam splitter, and a photo-detector configured to separately detect the p-polarized light component and the s-polarized light component divided by the divider.

6 Claims, 18 Drawing Sheets

X Component of Electric Field

Y Component of Electric Field

Intensity of Light Returned to Surface A

Light Intensity on Surface B

Light Intensity on Surface B

Light Intensity on Surface C

Light Intensity on Surface B

Light Intensity on Surface C

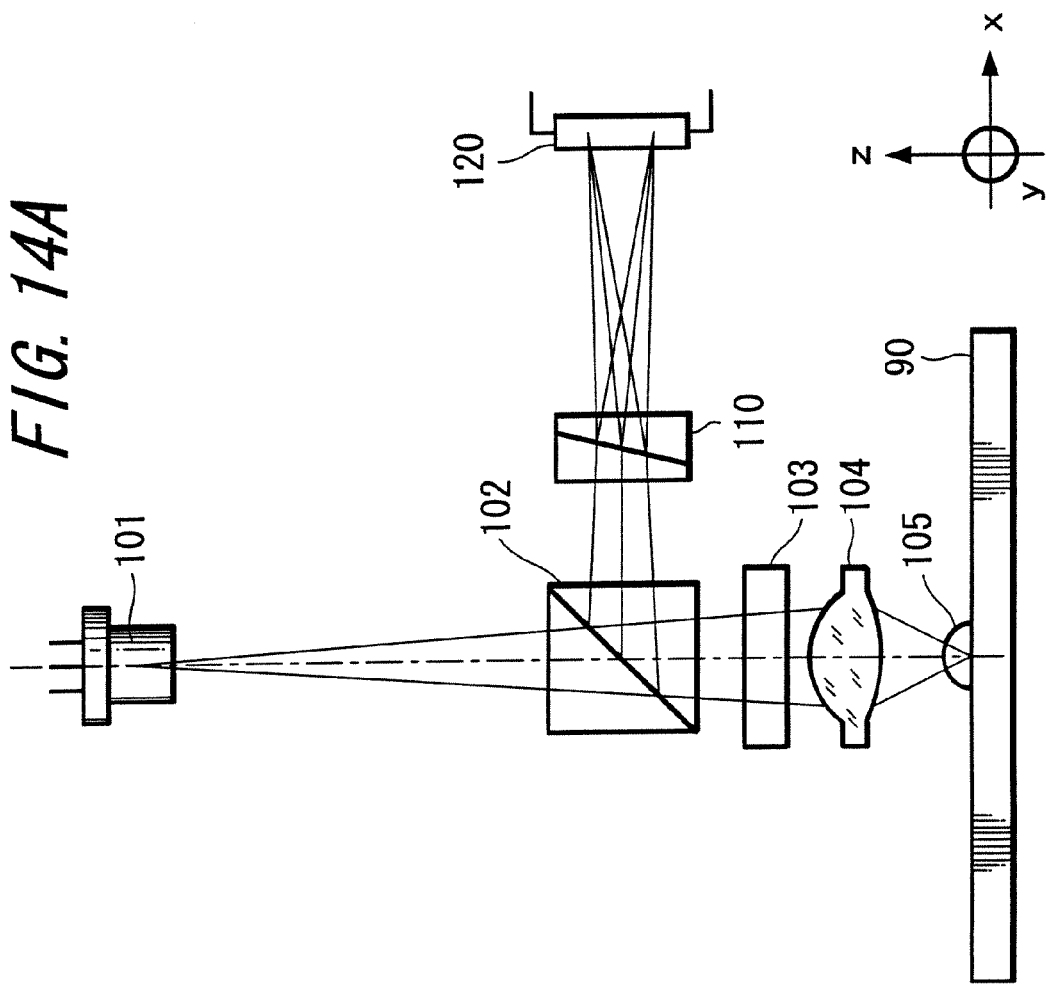

FIG. 15A
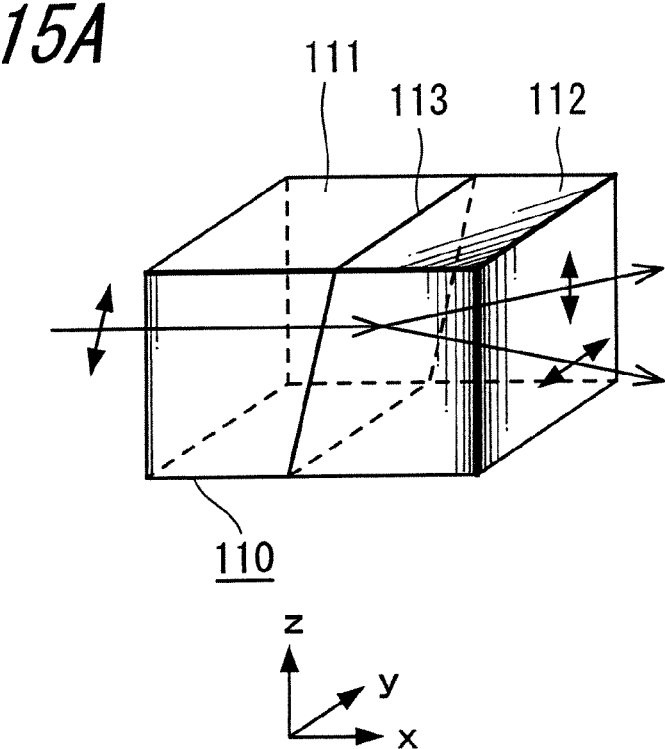
FIG. 15B
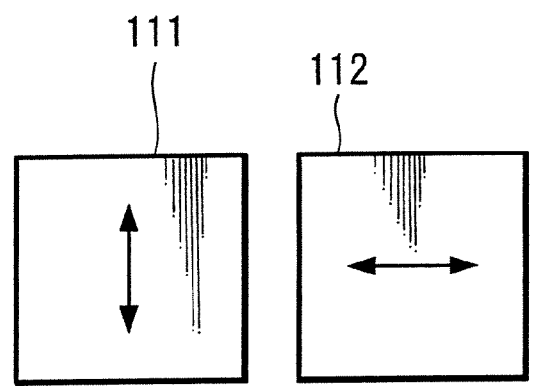
C-Axis Direction
n1: Refractive Index of C-Axis Direction
n2: Refractive Index of Opposite Direction
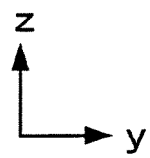

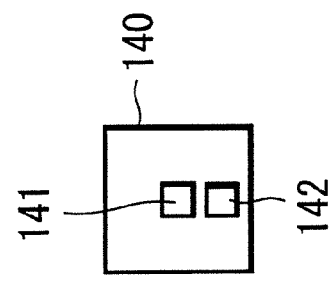
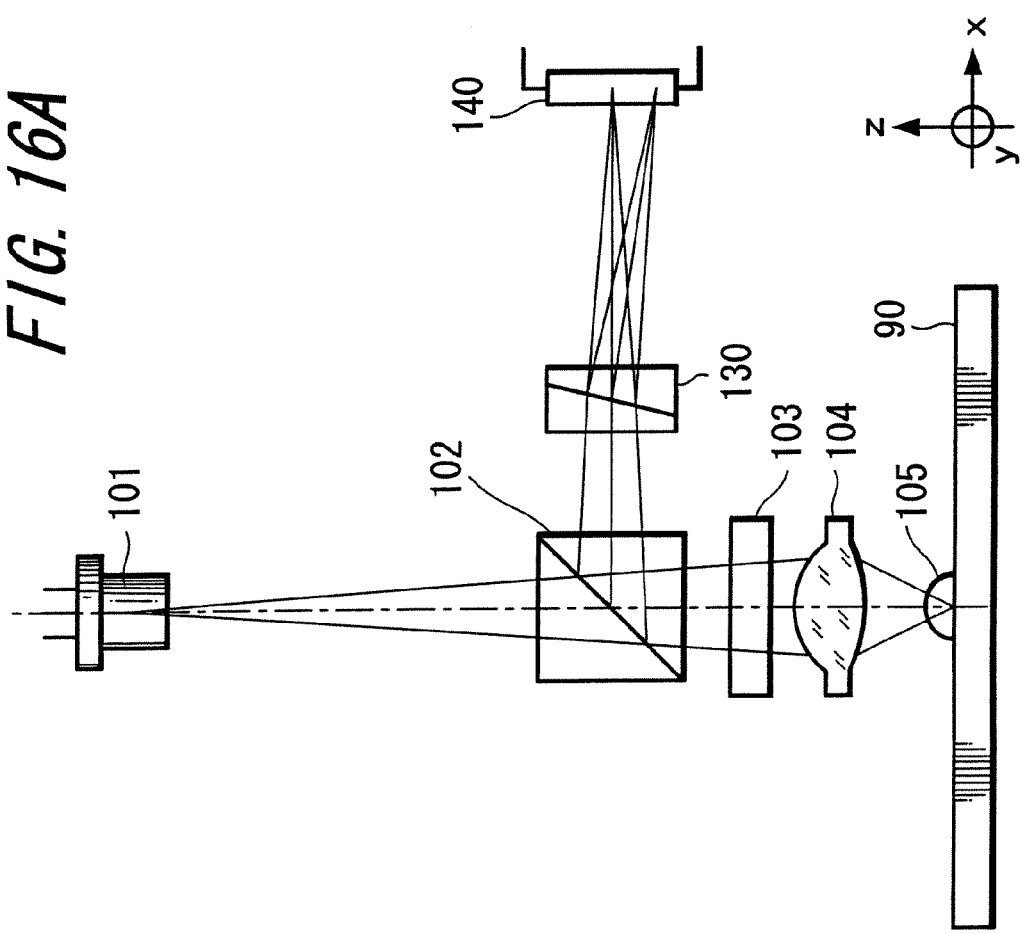

FIG. 17A
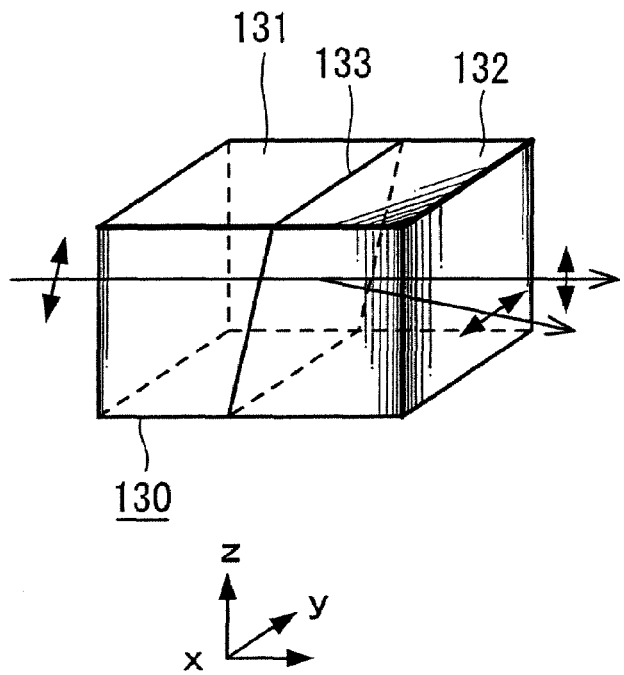
FIG. 17B
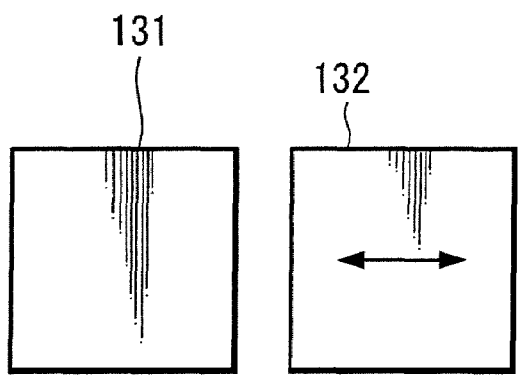
C-Axis Direction
$n_1$: Refractive Index of C-Axis Direction
$n_2$: Refractive Index of Opposite Direction
$n_G$: Refractive Index of Glass
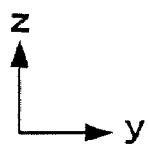

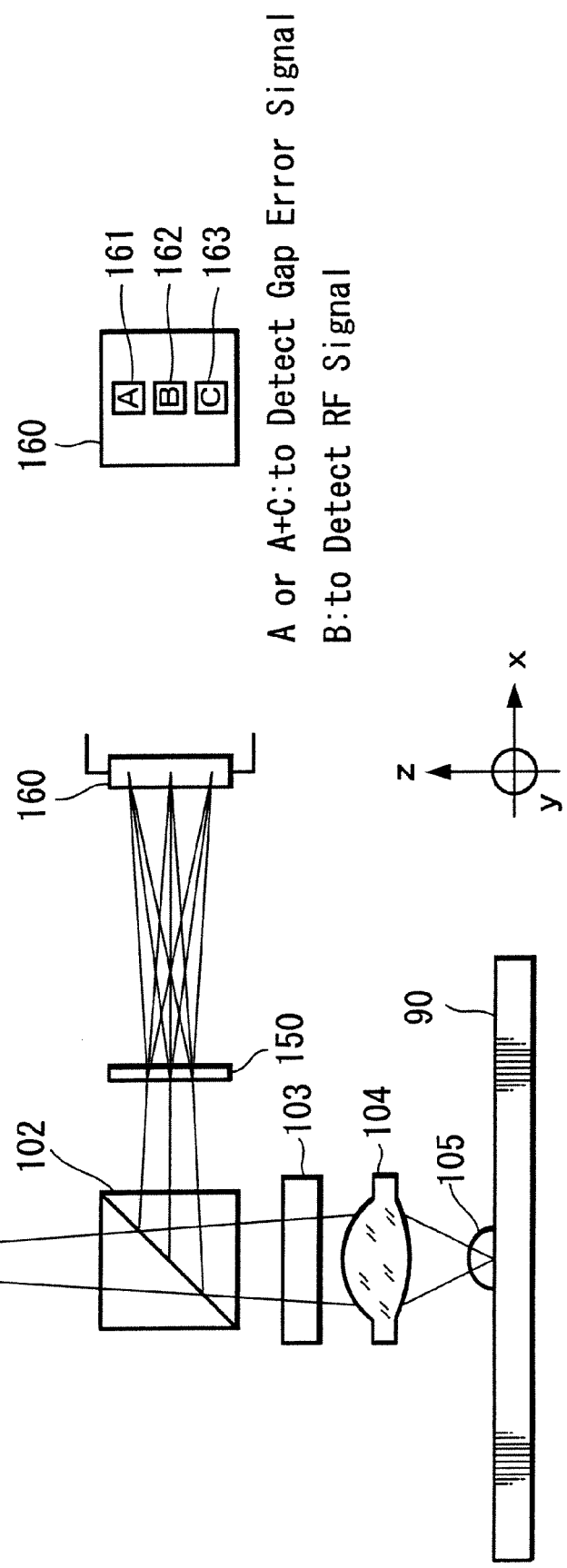

OPTICAL PICKUP DEVICE, RECORDING AND REPRODUCING APPARATUS AND GAP DETECTION METHOD

CROSS-REFERENCE TO RELATED APPLICATIONS

This application is a continuation of U.S. application Ser. No. 10/714,866, filed Nov. 18, 2003, and is based upon and claims the benefit of priority from prior Japanese Patent Application No. 2002-341378, filed Nov. 25, 2002, the entire contents of each of which are incorporated herein by reference.

BACKGROUND OF THE INVENTION

1. Field of the Invention

The present invention relates to an optical pickup device, and an optical recording and reproducing apparatus including this optical pickup device (this optical recording and reproducing apparatus contains a magneto-optical recording and reproducing apparatus) and a gap detection method, and more particularly to an optical pickup device, an optical recording and reproducing apparatus and a gap detection method for use with a so-called near-field optical recording and reproducing system for recording and/or reproducing an optical recording medium while an optical lens is increasing its numerical aperture.

2. Description of the Related Art

Optical recording mediums, which are typically available in the form of a compact disc (CD), a mini disc (MD) and a digital video disc (DVD), have been so far widely used as storage mediums for storing therein music information, video information, data, programs and the like ("optical recording medium" in this specification refers to not only the optical recording medium but also a "magneto-optical recording medium").

These optical recording mediums can be recorded and/or reproduced by laser beams irradiated on the signal recording surface of the optical recording medium from the optical pickup device. Specifically, when the optical recording medium is reproduced by an optical pickup device according to the related art, for example, very small changes of reflectance are read out from pits formed on one side of the optical recording medium through a non-contact objective lens, which is not in contact with the optical recording medium, such as an objective lens of a microscope. In the magneto-optical detection, miniscule magnetic domains are read out from the magneto-optical disk based upon a Kerr rotation angle.

The diameter of beam spot on the optical disk is roughly given by $\lambda/NA$ (where $\lambda$ represents the wavelength of illumination light and NA represents the numerical aperture of the lens), and resolution is proportional to the value given by this equation. With respect to the numerical aperture NA, the following equation is established:

$$NA = n \cdot \sin \theta$$

(where n represents the refractive index of the medium and $\theta$ represents the angle of rays of light around the objective lens).

When the medium is air, the numerical aperture NA is inhibited from exceeding 1. As a technology that can surpass this limit, there has been proposed an optical pickup device of a near-field optical recording and reproducing system using "solid immersion lens (see the following non-patent document 1).

The solid immersion lens (SIL) has the same refractive index as that of an optical disk substrate, and is shaped like a part of a sphere including a spherical surface portion and a flat surface portion, the flat surface portion thereof being very close to the surface of the optical recording medium. Evanescent wave transmits through the boundary surface between the solid immersion lens and the optical disk, and this evanescent wave reaches the signal recording surface of the optical disk.

Non-Patent Document 1:
I. Ichimura et. al, "Near-Field Phase-Change Optical Recording of 1.36 Numerical Aperture." Jpn. J. Appl. Phys. Vol. 39, 962-967 (2000)

Since it is customary for the above-mentioned optical pickup device to read an information signal from the optical disk while the optical disk is being rotated, the optical disc and the solid immersion lens have to require a gap (space) therebetween. Therefore, the evanescent wave should be used in order to achieve the numerical aperture NA greater than 1. Since the evanescent wave attenuates exponentially from the interface, the gap between the optical disk and the solid immersion lens should be made extremely thin, i.e., approximately 10/1 of the wavelength $\lambda$ of light from the light source of the optical pickup device, for example. Moreover, in order to reduce the area of the gap, the gap has to approach the signal recording surface of the optical disk.

As a method for controlling the above gap, there has hitherto been proposed a method for servo-controlling a distance (gap) between a solid immersion lens and an optical disk based upon a gap error signal after the gap error signal has been obtained by detecting an electrostatic capacity between an electrode formed on the surface of the solid immersion lens and the optical disk.

However, in order to execute this previously-proposed method, the electrode has to be formed on the surface of the solid immersion lens and a signal line has to be led from this electrode to a control circuit so that the optical pickup device becomes complex in arrangement, and hence it becomes difficult to manufacture the optical pickup device.

On the other hand, in the mastering process of the optical disk, the assignee of the present application has previously proposed a method for using returned light detected from a glass master disk as a gap error signal (see Japanese patent application No. 10-249880).

When the solid immersion lens and the glass master disk have no gap therebetween, the surface of the solid immersion lens is in contact with the transparent photoresist on the glass master disk, and hence no light is returned from the surface of the solid immersion lens. Conversely, when the solid immersion lens and the glass master disk have the gap therebetween, light that has been totally reflected on the surface of the solid immersion lens is returned. The above previously-proposed method is able to detect the gap between the solid immersion lens and the glass master disk by using this returned light.

However, this previously-proposed method can be used only when the master disk is made of glass and the photoresist for use in exposure is transparent. If the master disk has a reflective film such as an aluminum film, a phase-change film and a magneto-optical recording film deposited on its surface like an optical disk, then even when the solid immersion lens and the master disk have no gap therebetween, light is reflected on the surface of the optical disk and no light is returned. Hence, this previously-proposed method cannot be used.

In order to solve the above-mentioned problem, the assignee of the present application has previously proposed an optical pickup device that can accurately detect a very small gap between an optical disk with a reflective film deposited on its surface and a solid immersion lens (see Japanese patent application No. 2001-264467).

The above previously-proposed optical pickup device will be described below with reference to the drawings.

FIG. 1 of the accompanying drawings is a side view showing an arrangement of an example of this optical pickup device.

As shown in FIG. 1, the optical pickup device includes an objective lens 2 composed of a solid immersion lens (SIL) 1 having a spherical portion and a flat surface portion parallel to the surface of an optical recording medium 90 to form a part of a shape of a sphere, the objective lens 2 having a numerical aperture greater than 1. The solid immersion lens 1 is shaped like a hemisphere, for example, and has a thickness substantially equal to the radius of the sphere. A distance (gap) between the flat surface portion of the solid immersion lens 1 and the surface of the optical recording medium 90 can be held at approximately 10/1 of the wavelength of light emitted from a semiconductor laser 3 serving as a light source under control of a servo mechanism which will be described later on.

This optical pickup device is able to obtain a gap error signal corresponding to a distance between the surface of the optical recording medium 90 and the flat surface portion of the solid immersion lens 1 by detecting a component of the polarized state perpendicular to the polarized state of reflected light obtained when the surface of the optical recording medium 90 and the flat surface portion of the solid immersion lens 1 have no gap therebetween from reflected lights (returned lights) reflected on the optical recording medium 90 after they have been emitted from the semiconductor laser 3.

Specifically, in this optical pickup device, a bundle of rays emitted from the semiconductor laser 3 is collimated by a collimator lens 4 as a bundle of parallel rays and introduced into a beam splitter 5. A bundle of rays emitted from the semiconductor laser 3 has a wavelength of 400 nm, for example. A bundle of rays emitted from the semiconductor laser 3 transmits through the beam splitter 5 and becomes incident on a polarization beam splitter 6. A bundle of rays emitted from the semiconductor laser 3 is a p-polarized light relative to the reflection surface of the polarization beam splitter 6, and hence it transmits through the reflection surface of the polarization beam splitter 6, whereafter it transmits through the polarization beam splitter 6.

A bundle of rays that has transmitted through the polarization beam splitter 6 transmits through a λ/4 plate (quarter-wave plate) 7 with its crystallographic axis inclined at an inclination angle of 45° relative to the direction of the incident polarized light, by which it is double-refracted so as to become circularly polarized light and the circularly polarized light is introduced into an objective lens 8 comprising the condenser lens 2 together with the solid immersion lens 1. A bundle of incident parallel rays is converged by this objective lens 8 and introduced into the solid immersion lens 1. This solid immersion lens 1 has a focal point formed near a parallel portion disposed parallelly close to the surface of the optical recording medium 90. A refractive index of the solid immersion lens 1 is selected to be 1.8, for example.

A bundle of the thus converged rays is converged on the signal recording surface of the optical recording medium 90 as evanescent wave. In this case, the objective lens 2 has an NA (numerical aperture) of approximately 1.36, for example.

The optical pickup device shown in FIG. 1 is constructed as the optical pickup device capable of reproducing either an optical disk on which an information signal is recorded by recording pits (concavities and convexities) or a recordable optical disk on which an information signal is recorded by using phase-change. Specifically, a bundle of rays that has been converged on the signal recording surface of the optical recording medium 90 is reflected in various manners with or without application of the recording pits on this signal recording surface and returned to the polarization beam splitter 6 through the objective lens 2 and the quarter-wave plate 7.

A bundle of rays returned to the side of the condenser lens 3 after it has been reflected on the surface of the optical recording medium 90 is introduced into the quarter-wave plate 7, in which it is double-refracted in the form of circularly polarized light to linearly polarized light. At that time, the direction of polarized light is normal to the direction of polarization of a bundle of rays emitted from the semiconductor laser 3. Accordingly, a bundle of rays returned after it has been reflected on the surface of the optical recording medium 90 is s-polarized light relative to the reflection surface of the polarization beam splitter 6 and thereby reflected on the reflection surface of the polarization beam splitter 6 so that it is deviated from the light path along which it may return to the semiconductor laser 3, thereby being received at a first photo-detector 9 which is used to obtain a reproduced signal from the optical recording medium 90.

According to this optical pickup device, on the surface A between the beam splitter 5 and the polarization beam splitter 6, a bundle of rays emitted from the semiconductor laser 3 is linearly polarized light containing only an electric field component of X direction as shown in FIG. 2A but which does not contain an electric field component of Y direction as shown in FIG. 2B.

Then, in the state in which the flat surface portion of the solid immersion lens 1 is in close contact with the surface of the optical recording medium 90, this flat surface portion is in close contact with a phase-change recording and reproducing multilayer film (composed of Al film, $SiO_2$ film, GeSbTe film, $SiO_2$ film deposited on the substrate, in that order) deposited on the surface of the optical recording medium 90 as shown in FIG. 3A or a reflective film made of a suitable material such as aluminum (Al film deposited on a substrate) deposited on the surface of the optical recording medium 90 as shown in FIG. 3B.

As described above, in the state in which the flat surface portion of the solid immersion lens 1 is in close contact with the surface of the optical recording medium 90, most of reflected light is inwardly and outwardly transmitted through the quarter-wave plate 7 and thereby the reflected light is double-refracted so as to have the direction of polarization rotated 90° so that a bundle of rays with a distribution substantially equal to that of light emitted from the semiconductor laser 3 may become incident on the surface B that is the surface just ahead of the first photo-detector 9 as shown in FIG. 4A. At that time, as shown in FIG. 4B, reflected light is hardly returned from the optical recording medium 90 to the surface A between the beam splitter 5 and the polarization beam splitter 6.

Then, in the state in which the solid immersion lens 1 is away from the optical recording medium 90, as shown in FIG. 5, of light beams converged near the flat surface portion of the solid immersion lens 1, a light beam that will become incident on the flat surface portion at an incidence angle greater than a critical angle in this flat surface portion is reflected on the flat surface portion ((refractive index of solid immersion lens)× sin (incidence angle)>1).

In the thus reflected light, its direction of polarization is rotated delicately when it is totally reflected. The light beam that has been totally reflected as described above contains a polarized light component perpendicular to the reflected light obtained in the state in which the flat surface portion of the solid immersion lens 1 is in close contact with the surface of the optical recording medium 90 as described above. As a result, a distribution of the returned light on the surface A between the beam splitter 5 and the polarization beam splitter 6 becomes a distribution in which only light beams at the portions corresponding to the marginal portions of a bundle of rays are returned as shown in FIG. 6A.

The light beam that has returned to the surface A as described above is reflected on the reflection surface of the beam splitter 5 and received at a second photo-detector 10 which is used to obtain a gap error signal as shown in FIG. 1. This gap error signal is a signal corresponding to a distance between the flat surface portion of the solid immersion lens 1 and the optical recording medium 90.

Then, at that time, a distribution of the returned light beam on the surface B located just ahead of the first photo-detector 9 becomes a distribution in which returned light beams at the portions corresponding to the marginal portions of a bundle of rays are missed.

In a relationship between a quantity of light received at the second photo-detector 10 and the distance (air gap) between the flat surface portion of the solid immersion lens 1 and the surface of the optical recording medium 90, this distance (air gap) can be held at 10/1 of the wavelength by controlling the position at which the solid immersion lens 1 comes in contact with or comes away from the optical recording medium 90 in such a manner that the quantity of light at the second photo-detector 10, for example, may be kept at the ratio of quantity of incident light of 0.2 as shown in FIG. 7.

When the optical recording medium 90 is a magneto-optical disk, an optical pickup device having an arrangement shown in FIG. 8, for example, can be applied to this example. Specifically, as shown in FIG. 8, a bundle of rays emitted from the semiconductor laser 3 is converged on the signal recording surface of the optical recording medium 90 through the collimator lens 4, the polarization beam splitter 6, the beam splitter 5, the condenser lens 8 and the solid immersion lens 1. In this optical pickup device, a quarter-wave plate is not provided on the outward light path to the optical recording medium 90.

Then, the returned light beam that has been reflected on the optical recording medium 90 is divided by the beam splitter 5, whereafter it is refracted by a λ/2 plate (half-wave plate) 11 (i.e., polarization filter) so that its direction of polarization is rotated 45° and introduced into a second polarization beam splitter 12. This half-wave plate 11 is disposed with its optical axis inclined 22.5° relative to the direction of incident linearly polarized light.

The light beam that became incident on the second polarization beam splitter 12 is divided in response to a Kerr rotation angle generated based on a magneto-optical effect when it is reflected on the signal recording surface of the optical recording medium 90, and it is received at the first and second photo-detectors 13 and 14, both of which are used to obtain a magneto-optical signal. A difference signal between outputted signals from the first and second photo-detectors 13, 14 is not generated when a bundle of reflected rays does not generate the Kerr rotation angle and becomes an output corresponding to the Kerr rotation angle generated in a bundle of reflected rays, which becomes a magneto-optical signal.

Then, a bundle of rays that has returned from the flat surface portion of the solid immersion lens 1 in order to obtain the gap error signal is returned through the beam splitter 5 to the polarization beam splitter 6. Then, it is reflected by this polarization beam splitter 6 and received at the third photo-detector 10 that is used to obtain the gap error signal.

When the optical recording medium 90 is the magneto-optical disk, the optical pickup device may be modified as an optical pickup device having an arrangement shown in FIG. 9, for example. Specifically, as shown in FIG. 9, a bundle of rays emitted from the semiconductor laser 3 may be converged on the signal recording surface of the optical recording medium 90 through the collimator lens 4, the beam splitter 5, the condenser lens 8 and the solid immersion lens 1.

The light beam that has been irradiated on the signal recording surface of the optical recording medium 90 in this manner is reflected on this signal recording surface and reflected on the beam splitter 5, whereafter it is further divided by the second beam splitter 15 into two bundles of rays. A bundle of rays that has passed the second beam splitter 15 is transmitted through the half-wave plate 11 and thereby its direction of polarization is rotated 45°, whereafter it is introduced into the polarization beam splitter 12. This half-wave plate 11 is located such that its optical axis is inclined at an inclination angle of 22.50 relative to the direction of incident linearly polarized light.

The light beam that has been introduced into the polarization beam splitter 12 is divided in response to the Kerr rotation angle generated by the magneto-optical effect when it is reflected on the signal recording surface of the optical recording medium 90 and received at the first and second photo-detectors 13 and 14 which are used to obtain the magneto-optical signal. A difference signal between the outputted signals from the first and second photo-detectors 13, 14 is not generated when a bundle of reflected rays does not have the Kerr rotation angle, and becomes an output corresponding to the Kerr rotation angle generated in this bundle of rays, which becomes a magneto-optical signal.

On the other hand, a bundle of rays reflected by the second beam splitter 15 is introduced into the second polarization beam splitter 16. Of this bundle of rays, a bundle of rays that has returned from the flat surface portion of the solid immersion lens 1 in order to obtain the gap error signal is reflected by the second polarization beam splitter 16 and received at the third photo-detector 10 that is used to obtain the gap error signal.

Also in the optical pickup device shown in FIG. 9, similarly to the case of the optical system shown in FIG. 1, the polarized state of incident light introduced into the beam splitter 5 becomes linearly polarized light that contains only the electric field component of the X direction as shown in FIG. 2A but that does not contain the electric field component of the Y direction as shown in FIG. 2B. Each of the beam splitters 5, 15 transmits and reflects the polarized components of both X, Y directions equally.

When the flat surface portion of the solid immersion lens 1 is in close contact with the surface of the optical recording medium 90, this flat surface portion is in close contact with the phase-change recording and reproducing multilayer film (composed of Al film, $SiO_2$ film, TeFeCo film, $SiO_2$ film deposited on the substrate, in that order) deposited on the surface of the optical recording medium 90 as shown in FIG. 10. A distribution of returned light on the surface B which is the surface required after the returned light has passed through the second polarization beam splitter 16 at that time becomes a distribution substantially equal to those of light beams emitted from the semiconductor laser 3 as shown in FIG. 11A. Then, in the surface C which is the surface disposed just before returned light is reflected by the second polarization beam splitter 16 and introduced into the third photo-detector 10, the returned light from the optical recording medium 90 is hardly returned as shown in FIG. 11B. Accordingly, when the flat surface portion of the solid immersion lens 1 is in close contact with the surface of the optical recording medium 90, returned light on the surface C is almost zero, and hence returned light hardly reaches the third photo-detector 10.

Then, in the state in which the solid immersion lens 1 is distant from the optical recording medium 90, as shown in FIG. 5, of light beams converged near the flat surface portion of the solid immersion lens 1, light incident on the flat surface portion of the solid immersion lens 1 at an angle exceeding the critical angle of this flat surface portion is totally reflected on this flat surface portion of the solid immersion lens 1 ((refractive index of solid immersion lens)×sin(incidence angle)>1)

The thus totally reflected light delicately rotates its direction of polarization when it is totally reflected. Then, the thus totally reflected light contains a polarized component normal to the reflected light obtained in the state in which the flat surface portion of the solid immersion lens 1 is in close contact with the surface of the optical recording medium 90 as described above. As a result, a distribution of the returned light on the surface C which is the surface required just before the light is reflected by the second polarization beam splitter 16 and introduced into the third photo-detector 10 becomes a distribution in which the portions corresponding to the marginal portions of a bundle of rays are partly returned as shown in FIG. 12B.

The light thus returned to the surface C is received at the second photo-detector 10 which is used to obtain a gap error signal. This gap error signal is a signal corresponding to the distance between the flat surface portion of the solid immersion lens 1 and the surface of the optical recording medium 90.

Then, at that time, a distribution of the returned light on the surface B which is the surface behind the second polarization beam splitter 16 becomes a distribution in which the portions corresponding to the marginal portions of a bundle of rays are missing as shown in FIG. 12A.

In a relationship between the quantity of light received at the third photo-detector 10 and the distance (air gap) between the flat surface portion of the solid immersion lens 1 and the surface of the optical recording medium 90, as shown in FIG. 13, this distance (air gap) can be held at 10/1 of the wavelength of the light by controlling the position of the direction in which the solid immersion lens 1 comes in contact with or comes away from the optical recording medium 90 such that the quantity of light of the third photo-detector 10, for example, is held at the ratio of quantity of incident light of 0.1.

However, when these previously-proposed optical pickup devices are in use, the arrangement shown in FIG. 1 requires a plurality of beam splitters such as the beam splitter 5 for obtaining the gap error signal and the polarization beam splitter 6 for obtaining the reproduced signal and also requires separately independent photo-detectors such as the photo-detector 10 for obtaining the gap error signal and the photo-detector 9 for obtaining the reproduced signal. There arises a problem, in which the optical pickup device becomes complex in arrangement. The optical pickup devices shown in FIGS. 8 and 9 needs much more beam splitters and photo-detectors. Further, a problem arises, in which the recording and reproducing apparatus requires the optical pickup device having the complex arrangement so that the recording and reproducing apparatus which assembles such optical pickup device also becomes complex in arrangement.

SUMMARY OF THE INVENTION

In view of the aforesaid aspects, it is an object of the present invention to provide an optical pickup device, a recording and reproducing apparatus and a gap detection method in which a distance between a recording medium and a solid immersion lens can be detected and controlled with ease in this kind of near-field optical recording and reproducing system.

According to an aspect of the present invention, there is provided an optical pickup device including a condenser lens composed of a solid immersion lens having a spherical surface portion and a flat surface portion parallel to the surface of an optical recording medium, the condenser lens having a numerical aperture greater than 1, a bundle of rays in a predetermined polarized state being irradiated on the optical recording medium from a light source through the condenser lens and a polarized state component perpendicular to the polarized state of reflected light obtained when a distance between the surface of this optical recording medium and the flat surface portion of the solid immersion lens is zero is detected from reflected light from the optical recording medium to obtain a signal corresponding to the distance between the surface of the optical recording medium and the flat surface portion of the solid immersion lens, comprising a beam splitter for reflecting both of a p-polarized light component and an s-polarized light component in reflected light beams from the optical recording medium, a dividing device for dividing the p-polarized light component and the s-polarized light component reflected by the beam splitter and a photo-detecting device for separately detecting the p-polarized light component and the s-polarized light component divided by the dividing device.

According to another aspect of the present invention, there is provided a recording and reproducing apparatus for recording and/or reproducing an optical recording medium by using an optical pickup device including a condenser lens composed of a solid immersion lens having a spherical surface portion and a flat surface portion parallel to the surface of the optical recording medium, the condenser lens having a numerical aperture greater than 1, the optical pickup device comprising a beam splitter for reflecting both of a p-polarized light component and an s-polarized light component in reflected light beams from the optical recording medium, a dividing device for dividing the p-polarized light component and the s-polarized light component reflected by the beam splitter and a photo-detecting device for separately detecting the p-polarized light component and the s-polarized light component divided by the dividing device, comprising a drive device for adjusting a distance between the optical recording medium and the flat surface portion of the solid immersion lens and a control device for controlling the adjustment state of the drive device based upon a detected signal obtained when light intensity of one polarized component detected by the photo-detecting means is detected as a signal corresponding to the distance between the surface of the optical recording medium and the flat surface portion of the solid immersion lens.

In accordance with a further aspect of the present invention, there is provided a gap detection method for detecting a gap between a flat surface portion of a solid immersion lens and an optical recording medium by an optical pickup device including a condenser lens composed of the solid immersion lens having a spherical surface portion and a flat surface portion parallel to the surface of the optical recording medium, the condenser lens having a numerical aperture greater than 1 when a bundle of rays in a predetermined polarized state is irradiated on the optical recording medium from a light source, comprising the steps of irradiating the optical recording medium with a bundle of rays in a predetermined polarized state through the condenser lens, reflecting both of a p-polarized light component and an s-polarized light component of reflected light of the light beam after the light beam has irradiated the recording medium, dividing the thus reflected p-polarized light component and s-polarized light component and detecting a distance between the optical recording medium and the flat surface portion of the solid immersion lens based upon light intensity of any one polarized light component of the thus divided p-polarized light component and s-polarized light component.

According to the present invention, since a beam splitter is provided to reflect both of a p-polarized light component and a s-polarized light component, the p-polarized light component and the s-polarized light component thus reflected by the beam splitter are divided and light intensity of one of the thus divided polarized light components is detected, it becomes possible to detect a signal corresponding to a distance between a flat surface portion of a solid immersion lens and the surface of an optical recording medium by a simple and efficient arrangement.

BRIEF DESCRIPTION OF THE DRAWINGS

FIGS. 14A and 14B are respectively diagrams showing an arrangement of an example of a main portion of an optical pickup device according to a first embodiment of the present invention, wherein FIG. 14A is a side view of the optical pickup device and FIG. 14B is a plan view of a pattern of a photo-detector for use with the optical pickup device shown in FIG. 14A;

FIGS. 15A and 15B are respectively diagrams to which reference will be made in explaining a Wollaston prism that is applicable to the optical pickup device according to the first embodiment of the present invention, wherein FIG. 15A is a diagram showing an arrangement of the Wollaston prism and FIG. 15B is a diagram showing polarization directions in the respective prisms;

FIGS. 16A and 16B are respectively diagrams showing an example of a main portion of an arrangement of an optical pickup device according to a second embodiment of the present invention, wherein FIG. 16A is a side view of the optical pickup device and FIG. 16B is a plan view showing a pattern of a photo-detector for use with the optical pickup device shown in FIG. 16A;

FIGS. 17A and 17B are respectively diagrams to which reference will be made in explaining a Glan-Thompson prism which is applicable to the optical pickup device according to the second embodiment of the present invention, wherein FIG. 17A is a diagram showing an arrangement of the Glan-Thompson prism and FIG. 17B is a diagram showing polarization directions of respective prisms;

FIGS. 18A and 18B are respectively diagrams showing an arrangement of an example of a main portion of an optical pickup device according to a third embodiment of the present invention, wherein FIG. 18A is a side view of the optical pickup device and FIG. 18B is a plan view showing a pattern of a photo-detector for use with the optical pickup device shown in FIG. 18A;

FIGS. 19A, 19B and 19C are respectively diagrams to which reference will be made in explaining a polarizing and dividing grating which is applicable to the optical pickup device according to the third embodiment of the present invention, wherein FIG. 19A is a perspective view showing an arrangement of the polarizing and dividing grating, FIG. 19B is a diagram showing the polarization directions in the polarizing and dividing grating and FIG. 19C is a diagram showing an arrangement of the polarizing and dividing grating in cross-section.

DESCRIPTION OF THE PREFERRED EMBODIMENTS

Figure 1:
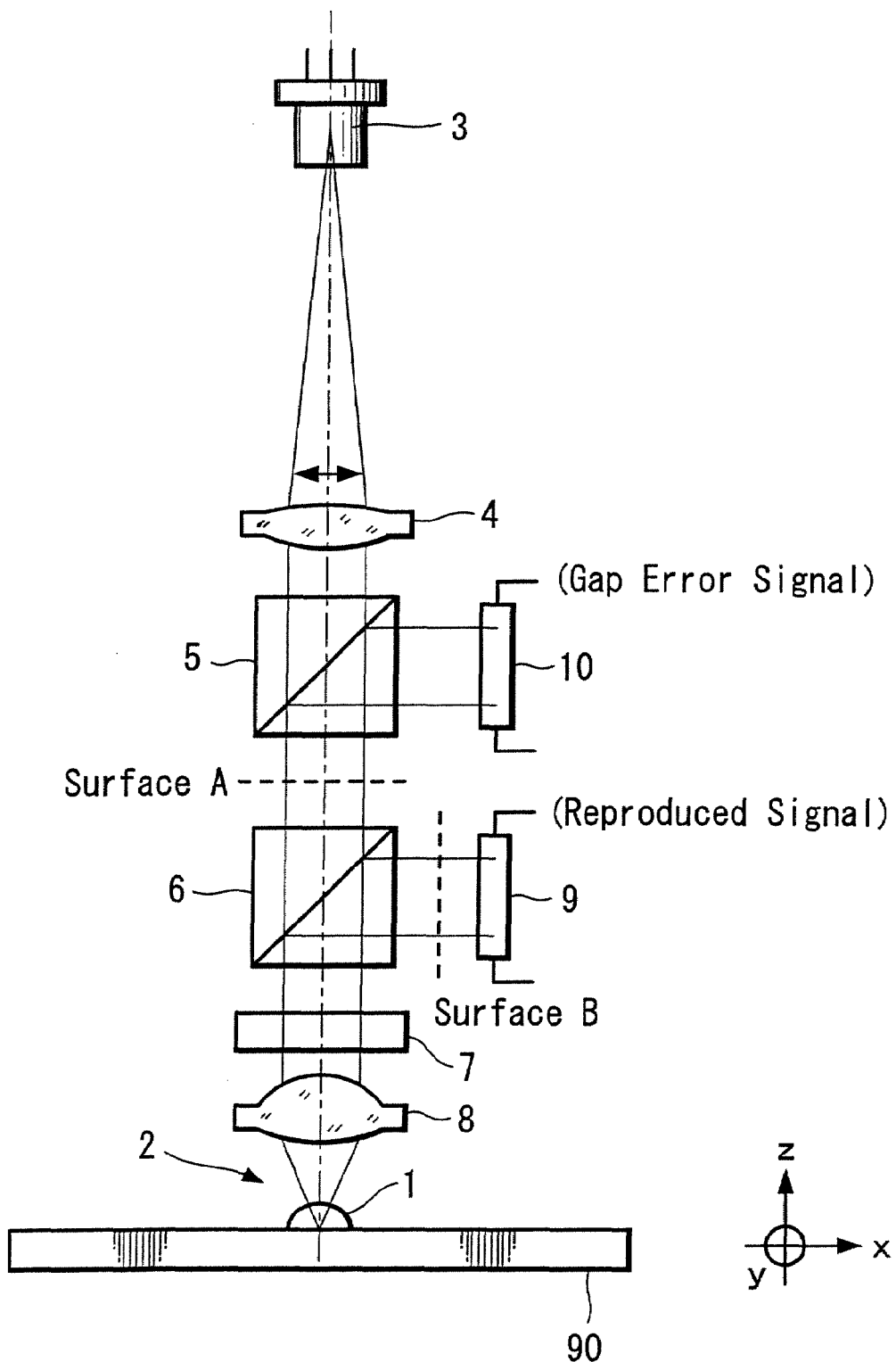
FIG. 1 is a side view showing an example of an arrangement of an optical pickup device according to the related art.
Figure 2A:
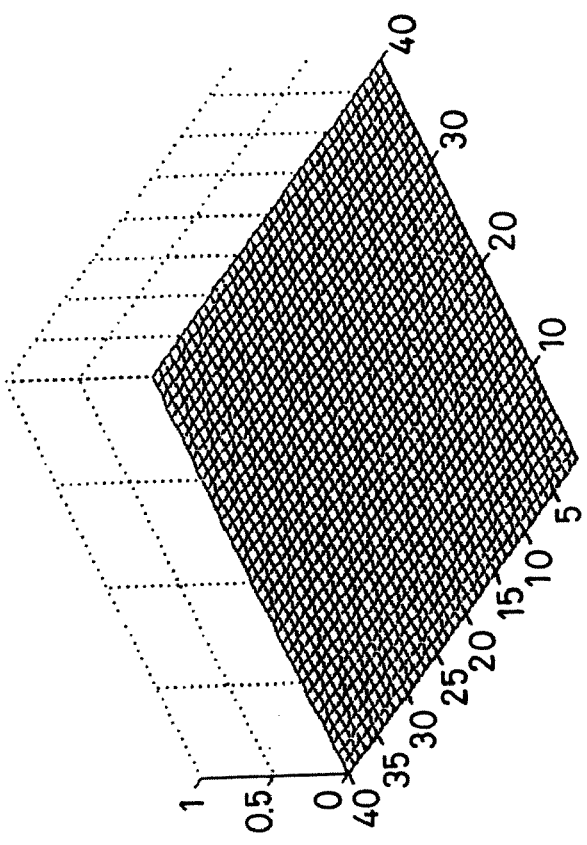
FIGS. 2A and 2B are respectively explanatory diagrams showing X component and Y component of an electric field of a bundle of rays incident on an optical recording medium in the optical pickup device of the example of the related art shown in FIG. 1.
Figure 2B:
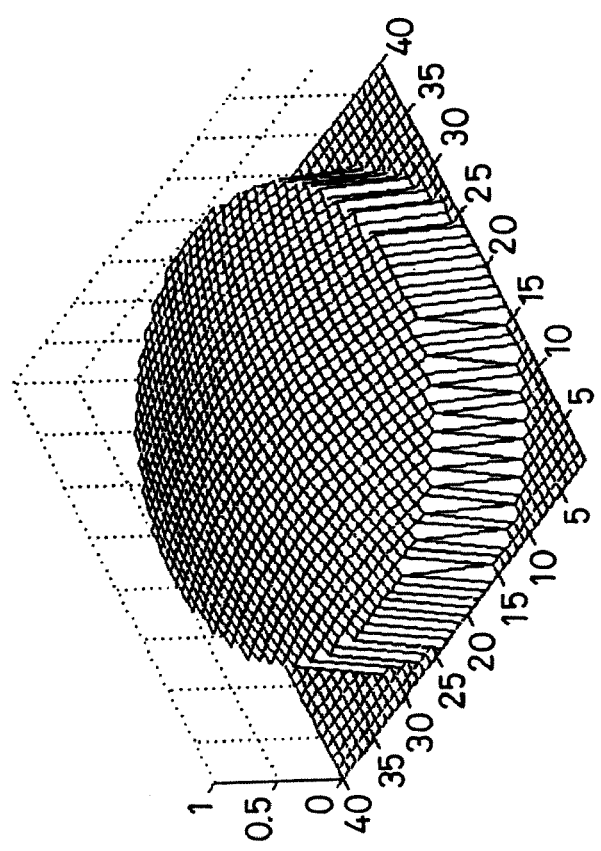
Figure 3A:
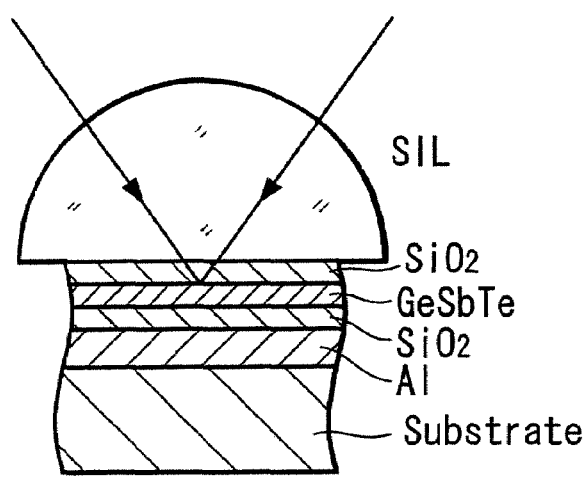
FIGS. 3A and 3B are respectively longitudinal cross-sectional views showing the state in which a solid immersion lens in the optical pickup device is in close contact with the optical recording medium.
Figure 3B:
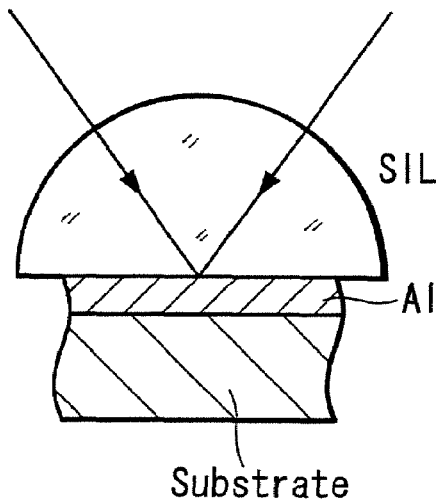
Figure 5:
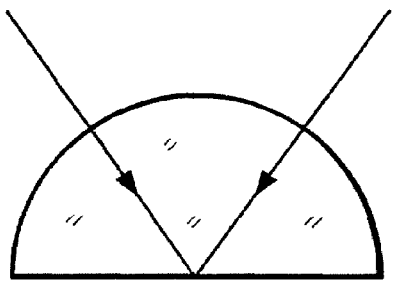
FIG. 5 is a longitudinal cross-sectional view showing the state in which the solid immersion lens in the optical pickup device is distant from the optical recording medium.
Figure 4B:
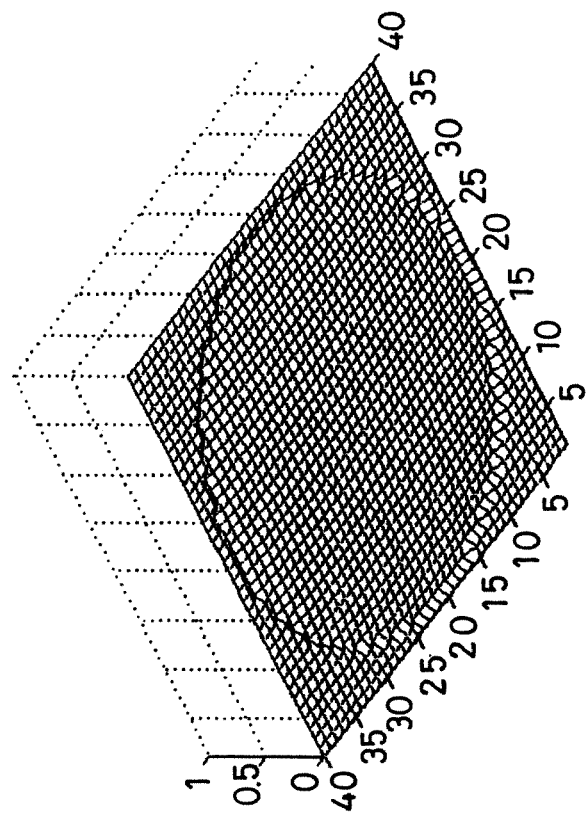
FIGS. 4A and 4B are respectively explanatory diagrams showing distributions of returned light returned from the optical recording medium when the solid immersion lens in the optical pickup device is in close contact with the optical recording medium.
Figure 4A:
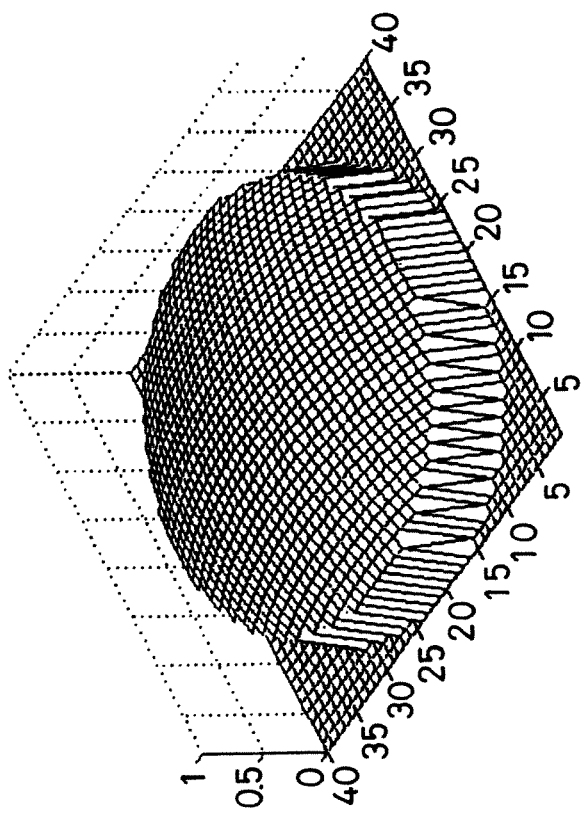
Figure 6A:
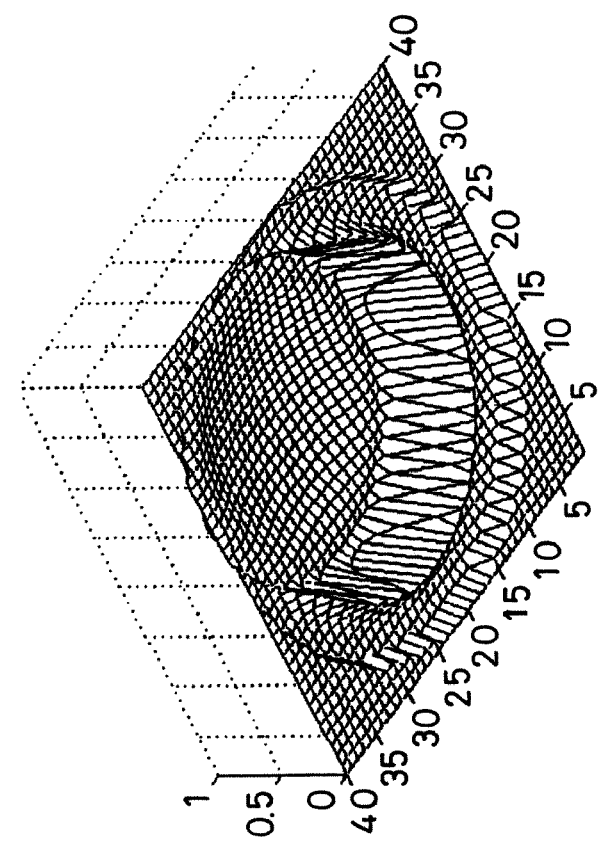
FIGS. 6A and 6B are respectively explanatory diagrams showing distributions of returned light returned from the optical recording medium when the solid immersion lens in the optical pickup device is distant from the optical recording medium.
Figure 6B:
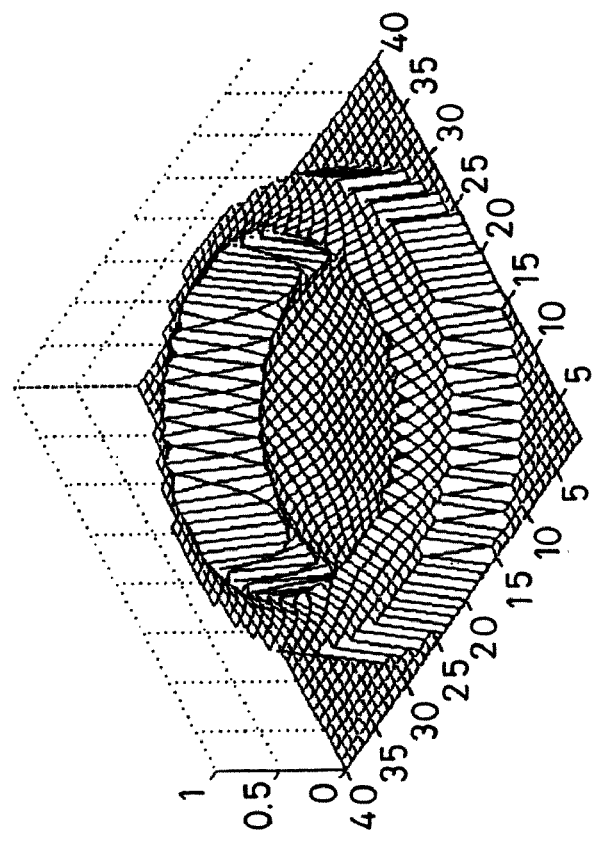
Figure 7:
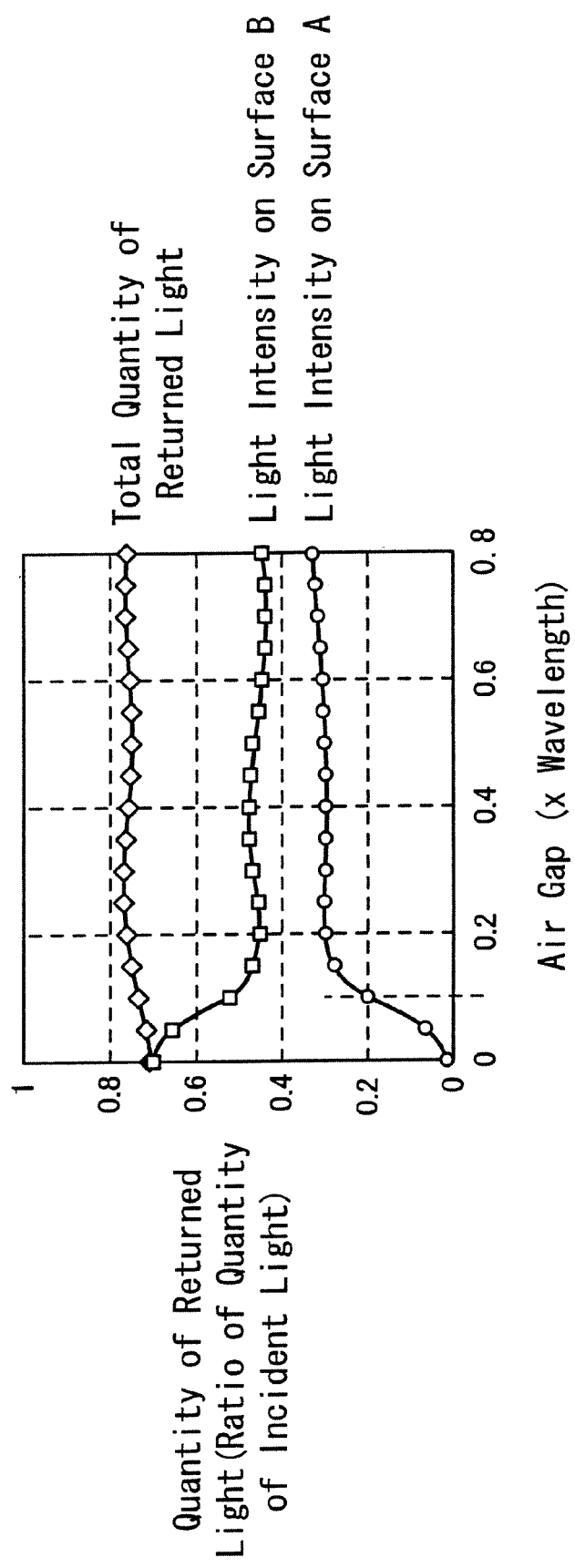
FIG. 7 is a diagram showing characteristic curves to which reference will be made in explaining an example of a relationship between a distance between the solid immersion lens in the optical pickup device and the optical recording medium and a gap error signal.
Figure 8:
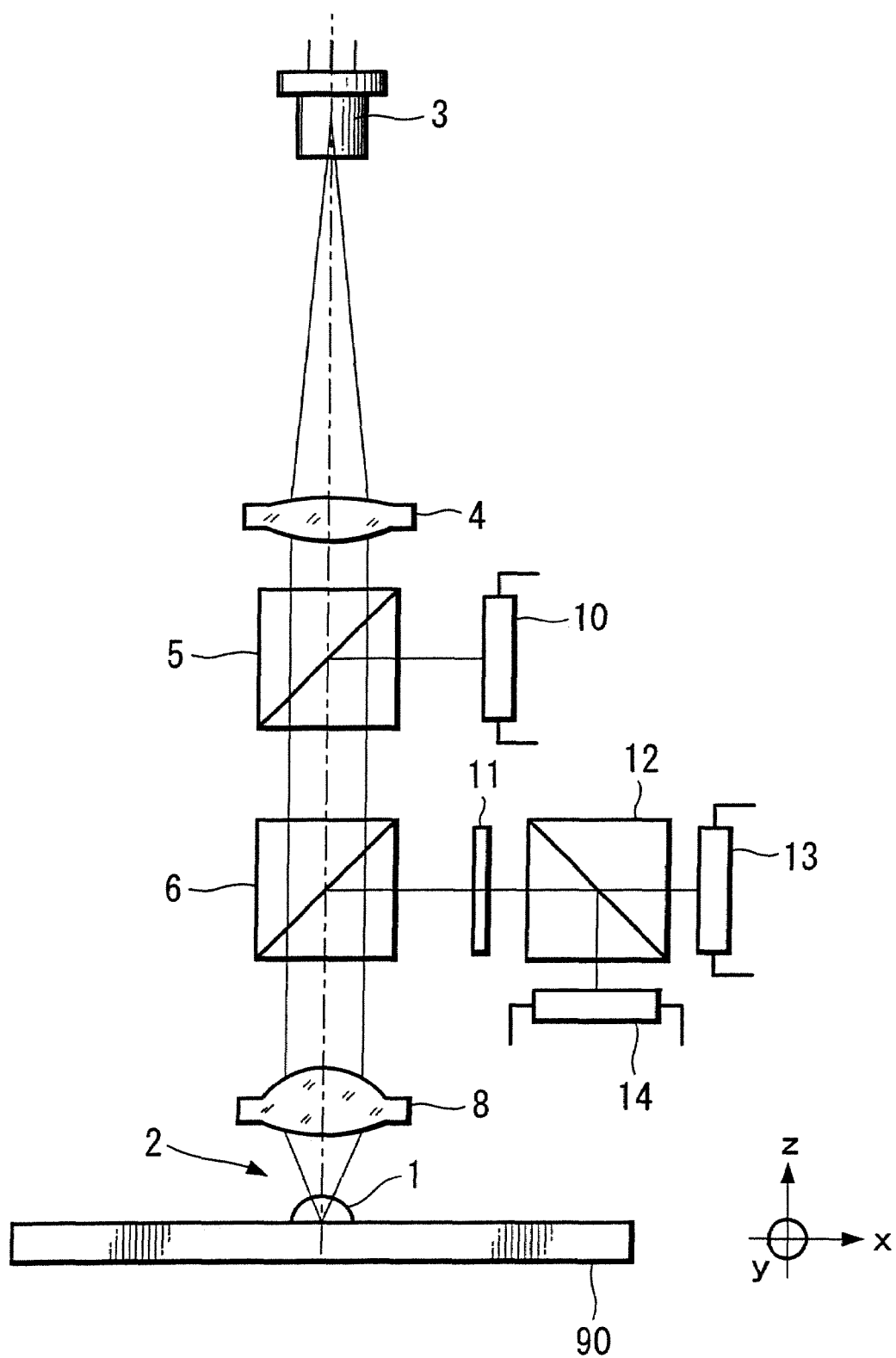
FIG. 8 is a side view showing other example of an arrangement of an optical pickup device according to the related art.
Figure 9:
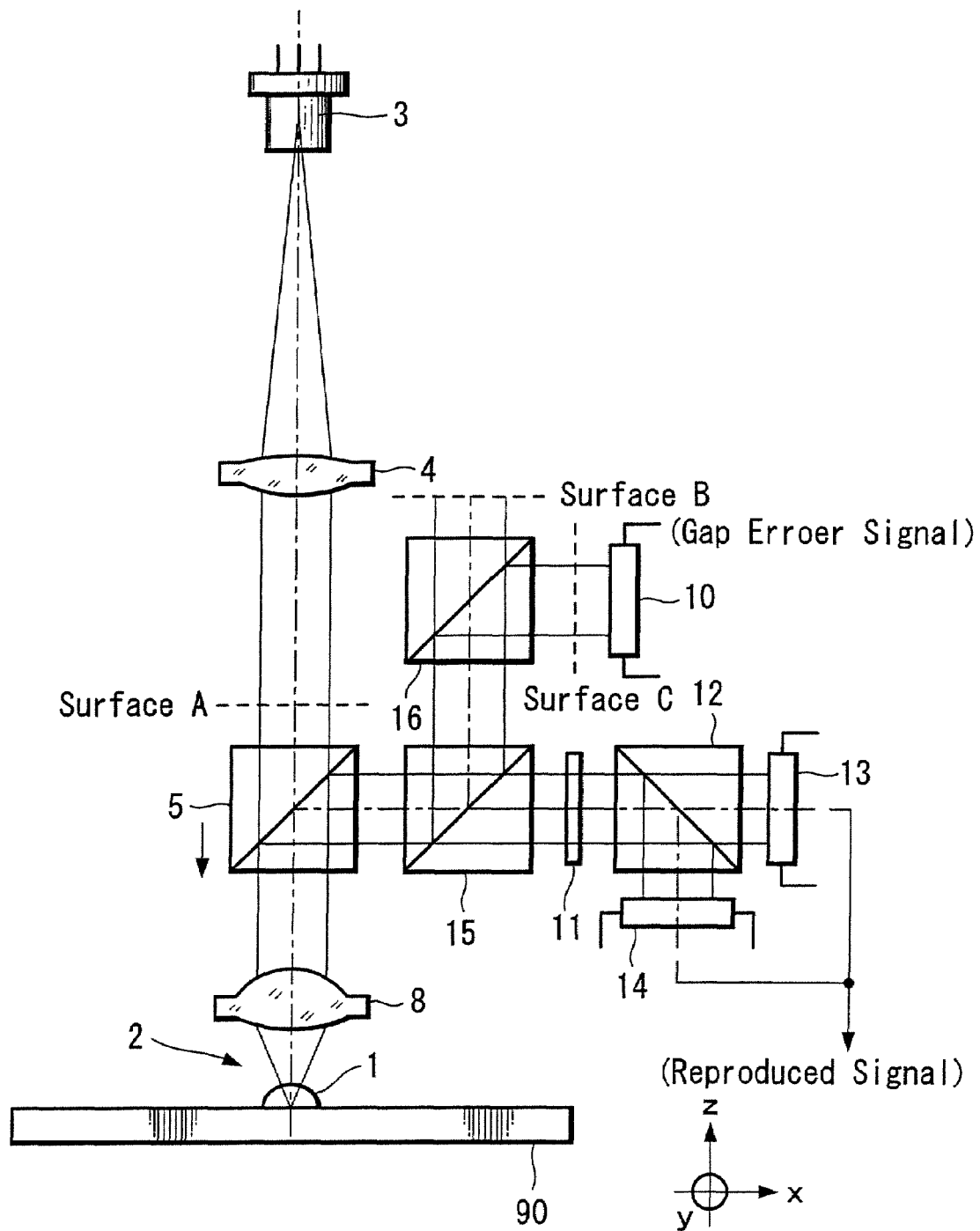
FIG. 9 is a side view showing a further example of an arrangement of an optical pickup device according to the related art.
Figure 10:
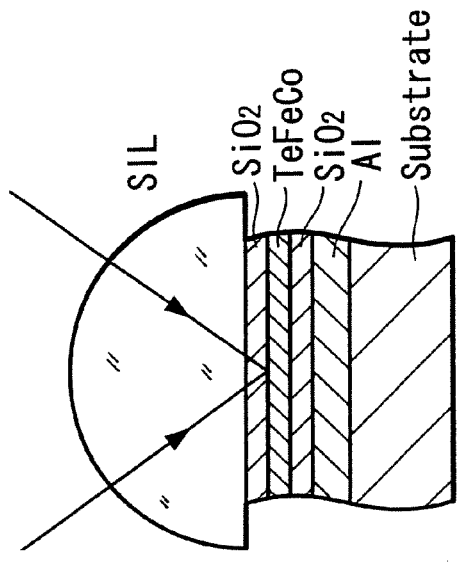
FIG. 10 is a longitudinal cross-sectional view showing the state in which a solid immersion lens in the optical pickup device in the example shown in FIG. 9 is in close contact with the optical recording medium.
Figure 13:
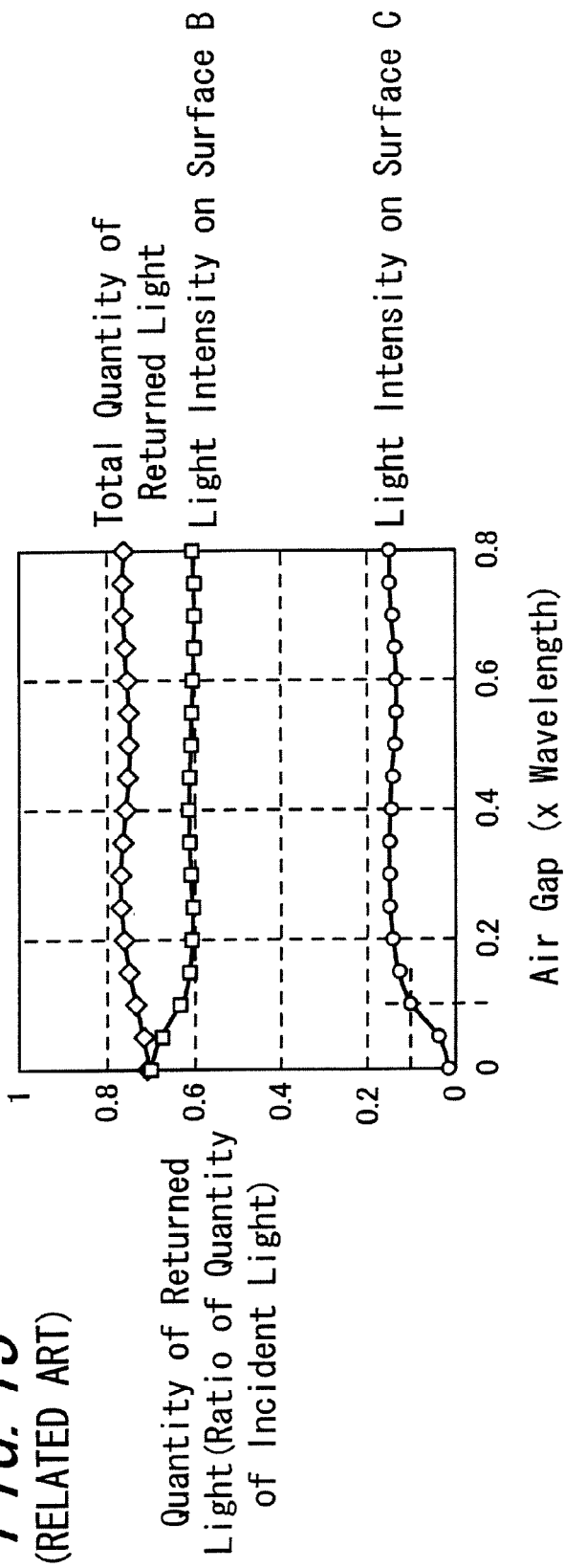
FIG. 13 is a diagram showing characteristic curves to which reference will be made in explaining a relationship between the distance between the solid immersion lens in the optical pickup device in the example shown in FIG. 9 and the optical recording medium and a gap error signal.
Figure 11A:
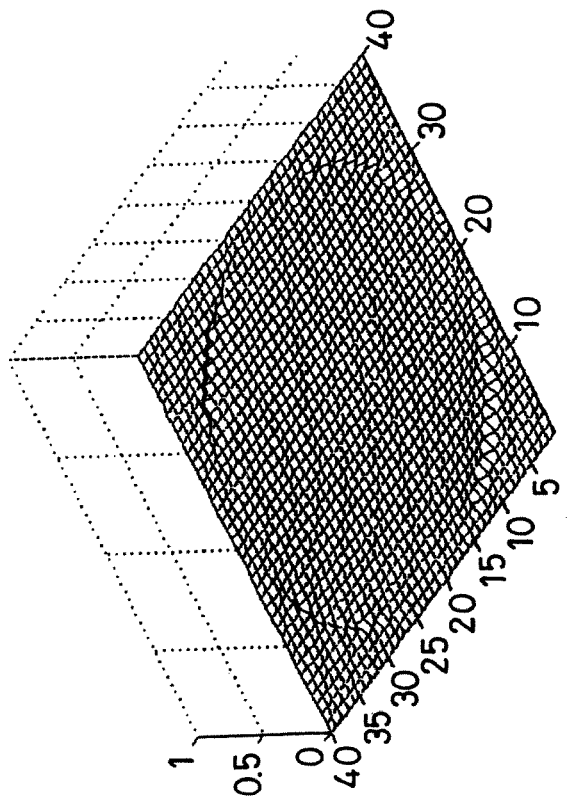
FIGS. 11A and 11B are respectively explanatory diagrams showing distributions of light beams returned from the optical recording medium when the solid immersion lens in the optical pickup device in the example shown in FIG. 9 is in close contact with the optical recording medium.
Figure 11B:
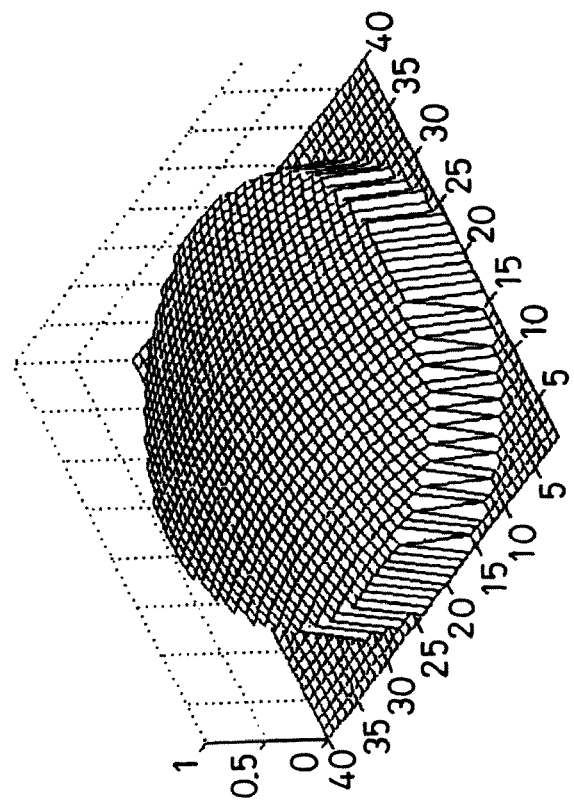
Figure 12A:
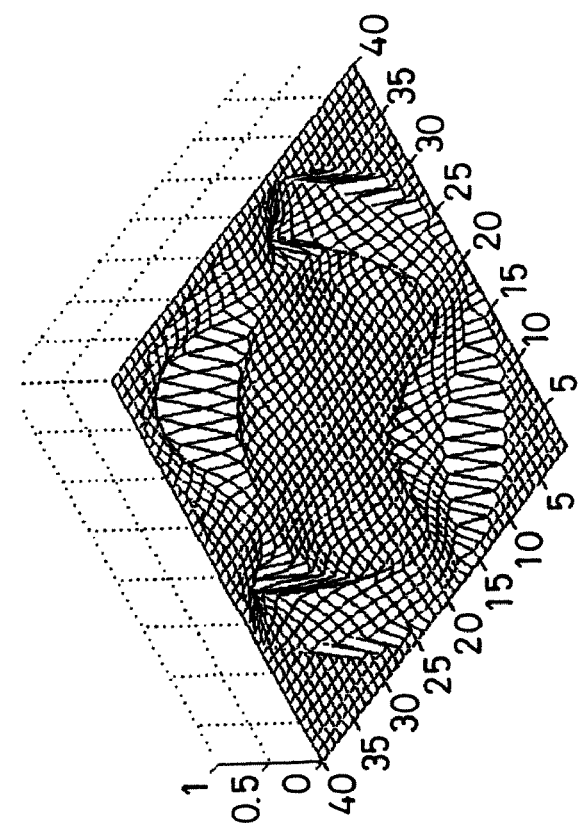
FIGS. 12A and 12B are respectively explanatory diagrams showing distributions of light beams returned from the optical recording medium when the solid immersion lens in the optical pickup device in the example shown in FIG. 9 is distant from the optical recording medium.
Figure 12B:
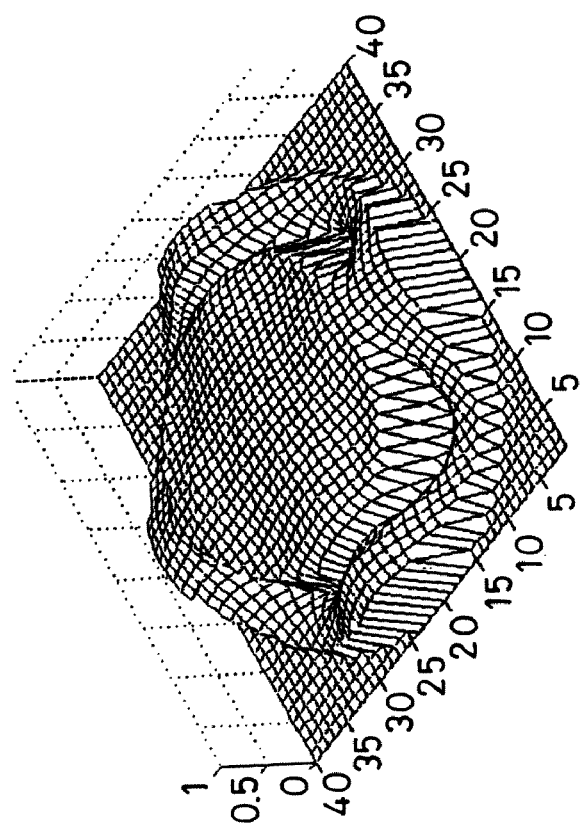
Figures 19A, 19B, 19C:
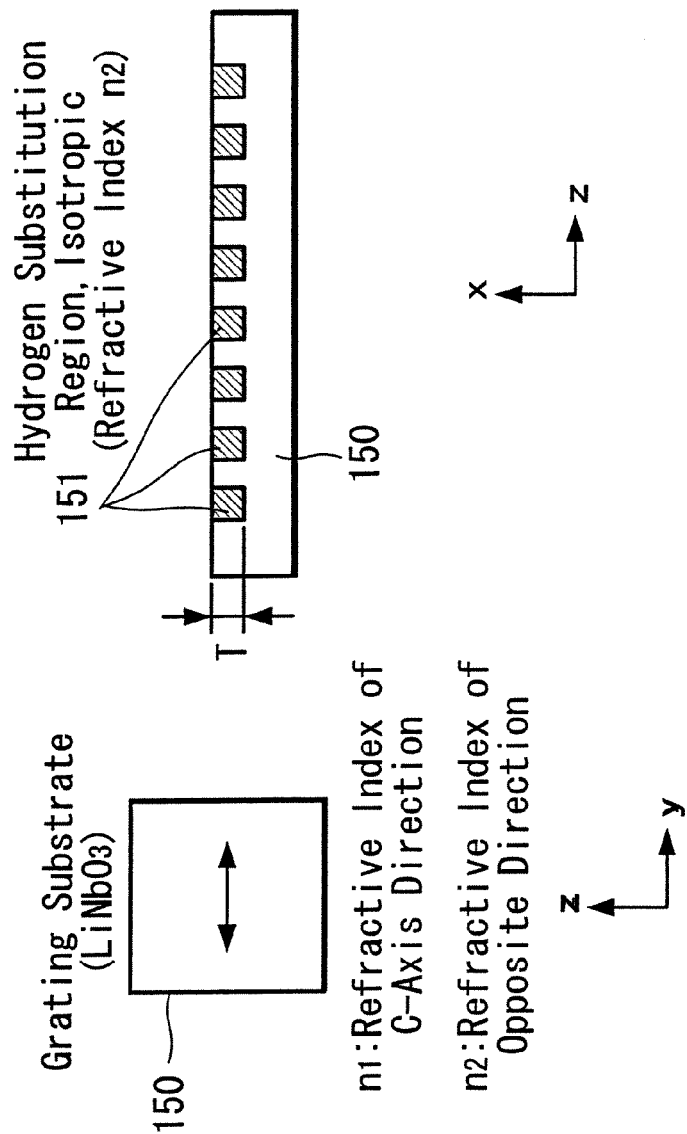

Embodiments of the present invention will now be described below.

Prior to the detailed description of the arrangement of the present invention, definitions of terms that will be used in the following descriptions will be described below in order to understand the present invention more clearly. In this specification, the term "optical recording and reproducing apparatus" refers to not only a "recording and reproducing apparatus for recording and reproducing an optical recording medium" but also a "recording apparatus for recording an optical recording medium" and a "reproducing apparatus for reproducing an optical recording medium". Moreover, as has already been described, the term "optical recording medium" also refers to other recording mediums such as a "magneto-optical recording medium in and from which information can be recorded and reproduced optically".

A first embodiment of the present invention will be described with reference to FIGS. 14A, 14B and FIGS. 15A, 15B.

FIGS. 14A and 14B are diagrams showing an arrangement of an optical pickup device according to a first embodiment of the present invention. As shown in FIGS. 14A and 14B, this optical pickup device includes a semiconductor laser 101 prepared as a light source, and a bundle of rays from this semiconductor laser 101 is introduced into a beam splitter 102. A bundle of rays emitted from the semiconductor laser 101 is transmitted through the beam splitter 102 and introduced into a quarter-wave plate ($\lambda$/4 plate) 103. The quarter-wave plate 103 is disposed such that its crystallographic axis is inclined at an inclination angle of 45° relative to the direction of polarization of incident light. The light that has become incident on the quarter-wave plate 103 is double-refracted as circularly polarized light and this circularly polarized light is introduced through a condenser lens composed of an objective lens 104 and a solid immersion lens (SIL) 105 into the signal recording surface of the optical recording medium 90.

As has been so far described as the related-art technology, the solid immersion lens 105 is disposed very close to the surface of the optical recording medium 90 (e.g. distance of about 50 nm) and is of a so-called hemispherical lens in which one surface on the side close to the optical recording medium 90 is shaped as a flat surface, the other surface close to the objective lens 104 is shaped as a spherical surface, a thickness thereof being selected to be the same as the radius of the spherical surface. Alternatively, the solid immersion lens 105 may be shaped like a super-hemispherical type lens having a thickness larger than the radius of the spherical surface comprising the lens. Moreover, with respect to the surface of the side close to the optical recording medium 90, only the central portion through which a bundle of rays of laser light is transmitted may be formed as a flat surface and the marginal portion around the central portion may be formed as a suitable shape such as a cone. In the following description, the surface of the side close to the optical recording medium 90 will be simply referred to as a "flat surface". Herein, a "flat surface" refers to a flat surface in which a surface portion through which at least a bundle of rays of laser light is transmitted may be formed as a flat surface, and the whole of this surface portion need not always be shaped as the flat surface.

In this manner, since the objective lens 104 and the solid immersion lens 105 constitute the condenser lens, the numerical aperture (NA) of the condenser lens becomes greater than 1, and hence it becomes possible to record and reproduce information by the near-field optical recording and reproducing system.

Light that has been reflected on the surface of the optical recording medium 90 is introduced through the solid immersion lens 105 and the objective lens 104 into the quarter-wave plate 103. Light introduced into the quarter-wave 103 is double-refracted and thereby changed from circularly polarized light into linearly polarized light. The, the light that has transmitted through the quarter-wave plate 103 is introduced into the beam splitter 102. This beam splitter 102 is not a polarization beam splitter but may be a beam splitter for polarizing a bundle of rays introduced thereinto from the side of the optical recording medium 90 to provide two polarized light components of an s-polarized light component and a p-polarized light component so that the two polarized light components may be reflected to the lateral direction. Specifically, in this beam splitter 102, its reflected light is given the same polarized light component as that of the light from the light source, and the beam splitter 102 reflects 50% of the light incident thereon from the objective lens 104, for example, to the lateral direction by the reflection surface thereof.

The returned light that has been reflected to the lateral direction by the beam splitter 102 is introduced into a dividing means for dividing incident light into an s-polarized light component and a p-polarized light component. In this embodiment, a Wollaston prism 110 is used as the dividing means. The incident light is divided into an s-polarized light component and a p-polarized light component by the Wollaston prism 110, and the thus divided s-polarized light component and p-polarized light component are introduced into an RF (radio frequency) signal detecting unit 121 and a gap error signal detecting unit 122 which are adjoining to each other on the same plane of the photo-detector 120.

As shown in FIGS. 15A and 15B, the Wollaston prism 110 is composed of a first prism 111 and a second prism 112 that are joined to each other in such a manner that C axes of crystals of two prisms thereof may become different from each other 90°. When incident light is refracted on a joint surface 113 of the two prisms 111 and 112, polarized light in the same direction as the C-axis direction of the first prism 111 is given an emission angle $\theta_0$ (incidence angle $\theta_1$) that can satisfy $n_1 \sin \theta_1 = n_2 \sin \theta_0$ on the joint surface 113. Moreover, polarized light in the opposite direction of the C-axis direction of the first prism 111 is given the emission angle $\theta_0$ that can satisfy $n_2 \sin \theta_1 = n_1 \sin \theta_0$ on the joint surface 113.

Accordingly, the photo-detector 120 having the two adjacent photo-detecting units 121, 122 on the same plane is disposed at a light emission portion from which the light that has transmitted through this Wollaston prism 110 is emitted, whereby the s-polarized light component is introduced into the RF signal detecting unit 121 of the photo-detector 120 and the p-polarized light component is introduced into the gap error signal detecting unit 122 of the photo-detector 120. The signal introduced into the RF signal detecting unit 121 becomes a signal corresponding to concavities and convexities of the pits of the optical recording medium 90 so that information can be reproduced from the optical recording medium 90. The signal introduced into the gap error signal detecting unit 122 becomes a gap error signal of which the light intensity changes in response to the distance (air gap) between the surface of the optical recording medium 90 and the flat surface portion of the solid immersion lens 105.

The p-polarized light component becomes the gap error signal based upon the same principle as that which has already been referred to as the related-art technology. Specifically, by detecting a component of the polarized state perpendicular to the polarized state of reflected light obtained when the distance between the surface of the optical recording medium 90 and the flat surface portion of the solid immersion lens 105 is zero from the reflected light (returned light) that was reflected by the optical recording medium 90 after they have been emitted from the semiconductor laser 101, it is possible to obtain the gap error signal corresponding to the distance between the surface of the optical recording medium 90 and the flat surface portion of the solid immersion lens 105.

By using the thus detected gap error signal, it becomes possible to servo-control the distance between the optical recording medium 90 and the solid immersion lens 105. A servo control mechanism will be described later on.

With the arrangement shown in FIGS. 14A, 14B and FIGS. 15A, 15B, the s-polarized light component and the p-polarized light component of the reflected light from the optical recording medium 90 can separately be detected by the simple arrangement using one beam splitter 102 and the Wollaston prism 110 serving as the dividing means for dividing incident light into the s-polarized light component and the p-polarized light component, the optical pickup device can be simplified in arrangement as compared with the related-art optical pickup device using a plurality of beam splitters, and hence the optical pickup device can be miniaturized in size. Moreover, with respect to the photo-detector, it is sufficient to prepare one photo-detector 120 that can detect the two polarized light components emitted from the Wollaston prism 110 at the adjacent two photo-detection positions on the same plane, and hence the photo-detector can be simplified in arrangement as compared with the case in which a plurality of photo-detectors are separately located at the different positions like the related-art. When the optical pickup device according to this embodiment is attached to the optical recording and reproducing apparatus, the recording and reproducing apparatus can be simplified in arrangement and miniaturized in size.

A second embodiment of the present invention will be described with reference to FIGS. 16A, 16B and FIGS. 17A, 17B. In FIGS. 16A, 16B and FIGS. 17A, 17B, elements and parts identical to those of FIGS. 14A, 14B that have been referred to in the first embodiment are denoted by the identical reference numerals.

According to this embodiment, while the Wollaston prism is used as the dividing means for dividing the incident light into the p-polarized light component and the s-polarized light component in the first embodiment, this embodiment uses a Glan-Thompson lens as the dividing means. A rest of the arrangement of the optical system is the same as that of the optical pickup device that has been described in the first embodiment.

Specifically, as shown in FIGS. 16A, 16B, there is prepared the semiconductor laser 101 as the light source, and a bundle of rays from this semiconductor laser 101 is introduced into the beam splitter 102. A bundle of rays incident on the beam splitter 102 from the semiconductor laser 101 is traveled through the beam splitter 102 and introduced into the quarter-wave plate (λ/4 plate) 103. The quarter-wave plate 103 is disposed such that its crystallographic axis is inclined at an inclination angle of 45° relative to the direction of polarization of the incident light. The quarter-wave plate 103 double-refracts the incident light to provide circularly polarized light. The circularly polarized light from the quarter-wave plate 103 is introduced into the signal recording surface of the optical recording medium 90 through a condenser lens composed of the objective lens 104 and the solid immersion lens (SIL) 105, the condenser lens having the numerical aperture (NA) greater than 1.

Light that has been reflected on the surface of the optical recording medium 90 is introduced through the solid immersion lens 105 and the objective lens 104 into the quarter-wave plate 103. The quarter-wave plate 103 double-refracts the incident light to change circularly polarized light to linearly polarized light. A bundle of rays that has transmitted through the quarter-wave plate 103 is introduced into the beam splitter 102. The beam splitter 102 is not the polarization beam splitter but may be a beam splitter for reflecting both of polarized light components of an s-polarized light component and a p-polarized light component of a bundle of rays introduced thereinto from the side of the optical recording medium 90 to the lateral side.

The returned light reflected to the lateral side by the beam splitter 102 is introduced into the dividing means that divides incident light into an s-polarized light component and a p-polarized light component. In this embodiment, a Glan-Thompson prism 130 is used as the dividing means. The incident light is divided into an s-polarized light component and a p-polarized light component by the Glan-Thompson prism 130, and the thus divided s-polarized light component and p-polarized light component are introduced into an RF (radio frequency) signal detecting unit 141 and a gap error signal detecting unit 142 which are adjacent to each other on the same plane of a photo-detector 140.

The Glan-Thompson prism 130 comprises a glass 131 and a prism 132 which are joined together on a joint surface 133 as shown in FIGS. 17A, 17B. When incident light is refracted on the joint surface 133 of the Glan-Thompson prism 130, polarized light polarized in the same direction as the C-axis direction of the prism 132 is given an emission angle $\theta_0$ (incidence angle $\theta_1$) that can satisfy $n_G \sin \theta_1 = n_1 \sin \theta_0$ on the joint surface 133. Moreover, polarized light polarized in the opposite direction of the C-axis direction of the prism 132 is given an emission angle $\theta_0$ that can satisfy $n_G \sin \theta_1 = n_2 \sin \theta_0$ on the joint surface 133.

Accordingly, the photo-detector 140 having the adjacent two photo-detecting units 141, 142 on the same plane is located at a light emission portion from which light that has transmitted through the Glan-Thompson prism 130 is emitted, whereby the s-polarized light component is introduced into the RF signal detecting unit 141 of the photo-detector 140 and the p-polarized light component is introduced into the gap error signal detecting unit 142 of the photo-detector 140. Since the Wollaston prism 110 that has been described in the first embodiment and the Glan-Thompson prism 130 have different emission angles of two polarized light components, the photo-detector 140 used in this embodiment has to locate its respective photo-detecting units 141, 142 at slightly different positions from those at which the photo-detector 120 that has been described in the first embodiment has located its respective photo-detecting units 121 and 122.

With this arrangement, the signal that is introduced into the RF signal detecting unit 141 becomes a signal corresponding to concavities and convexities of the pits on the optical recording medium 90 so that information can be reproduced from the optical recording medium 90. The signal that is introduced into the gap error signal detecting unit 142 becomes a gap error signal of which the light intensity changes in response to the distance between the surface of the optical recording medium 90 and the flat surface portion of the solid immersion lens 105. By using this gap error signal, it becomes possible to servo-control the distance between the optical recording medium 90 and the solid immersion lens 105. Accordingly, similarly to the optical pickup device that has been described so far in the first embodiment, also in this embodiment, the optical pickup device can be simplified in arrangement and miniaturized in size, by which the recording and reproducing apparatus can be simplified in arrangement and miniaturized in size.

A third embodiment of the present invention will be described with reference to FIGS. 18A, 18B and FIGS. 19A, 19B, 19C. In FIGS. 18A, 18B and FIGS. 19A, 19B, 19C, elements and parts identical to those of FIGS. 14A, 14B and FIGS. 16A, 16B that have been described in the first and second embodiments are denoted by the identical reference numerals.

According to this embodiment, while the Wollaston prism or the Glan-Thompson prism was used as the dividing means for dividing incident light into the p-polarized light component and the s-polarized light component in the first and second embodiments, according to this embodiment, a polarizing and dividing grating is used as the dividing means. A rest of fundamental arrangement of the optical system is the same as that of the arrangements of the optical pickup devices that have been described so far in the first and second embodiments.

Specifically, as shown in FIGS. 18A, 18B, the semiconductor laser 101 is prepared as the light source, and a bundle of rays from this semiconductor laser 101 is introduced into the beam splitter 102. A bundle of rays incident on the beam splitter 102 from the semiconductor laser 101 transmits through the beam splitter 102 and becomes incident on the quarter-wave plate (λ/4 plate) 103. The quarter-wave plate 103 is disposed such that its crystallographic axis is inclined at an inclination angle of 45° relative to the direction of polarization of incident light. The quarter-wave plate 103 double-refracts the incident light to provide circularly polarized light, and the circularly polarized light from the quarter-wave plate 103 is introduced into the signal recording surface of the optical recording medium 90 through the condenser lens composed of the objective lens 104 and the solid immersion lens (SIL) 105, the condenser lens having a numerical aperture (NA) greater than 1.

Light reflected on the surface of the optical recording medium 90 is introduced into the quarter-wave plate 103 through the solid immersion lens 105 and the objective lens 104. The quarter-wave plate 103 double-refracts the circularly polarized light to provide linearly polarized light. A bundle of rays that has passed through the quarter-wave plate 103 is introduced into the beam splitter 102. The beam splitter 102 is not a polarization beam splitter but is a beam splitter for reflecting a bundle of rays incident thereon from the side of the optical recording medium 90 as two polarized light components of an s-polarized light component and a p-polarized light component to the lateral direction.

The returned light that has been reflected toward the lateral side by the beam splitter 102 is introduced into a dividing means for dividing incident light into an s-polarized light component and a p-polarized light component. In this embodiment, a polarizing and dividing grating 150 is used as the dividing means. The incident light is divided into an s-polarized light component and a p-polarized light component by the polarizing and dividing grating 150, and the thus divided s-polarized light component and p-polarized light component are introduced into adjacent three photo-detecting units 161, 162, 163 on the same plane of a photo-detector 160. The p-polarized light component is divided into two p-polarized light components and the thus divided two p-polarized light components are introduced into the two photo-detecting units 161 and 163. The s-polarized light component is introduced into the photo-detecting unit 162.

The polarizing and dividing grating 150 has a substrate made of crystal such as LiNbO$_3$ in which a hydrogen substitution region 151 with lithium (Li) substituted with hydrogen (H) is formed on the surface of the substrate like a grating, a refractive index of the hydrogen substitution region 151 being selected to be n$_2$ regardless of the direction of polarization. Assuming now that the thickness of the hydrogen substitution region 151 is T, then with respect to the polarized light component of the C-axis direction, a phase difference of $2\pi(n_1 - n_2)T/\lambda$ occurs between the hydrogen substitution region 151 and other region and thereby the polarizing and dividing grating 150 acts as a grating. On the other hand, with respect to the polarized light component of the direction opposite to the C-axis direction, a refractive index difference does not occur between the hydrogen substitution region 151 and other region, and hence incident light transmits through the polarizing and dividing grating 150 without being diffracted. Assuming that P is the pitch of the grating, then an angle θ of the polarized component of the diffracted C-axis direction is given by λ/P=sin θ.

Accordingly, the photo-detector 160 with the adjacent three photo-detecting units 161, 162, 163 on the same plane is located at a light emission portion from which light that has passed through this polarizing and dividing grating 150 is emitted, whereby the p-polarized light component is introduced into the two gap error signal detecting units 161 and 163 and a gap error signal is obtained by using any one of the signals obtained at the two gap error signal detecting units 161, 163 or by using a signal which results from adding the two signals obtained from the two gap error signal detecting units 161, 163. This gap error signal has light intensity that changes in response to the distance between the surface of the optical recording medium 90 and the flat surface portion of the solid immersion lens 105. By using this gap error signal, it becomes possible to servo-control the distance between the optical recording medium 90 and the solid immersion lens 105 becomes possible.

The s-polarized light component is introduced into the RF signal detecting unit 162 and the signal outputted from this RF signal detecting unit 162 becomes the signal corresponding to concavities and convexities of the pits on the optical recording medium 90 so that information can be reproduced from the optical recording medium 90. Accordingly, similarly to the optical pickup devices that have been described in the first and second embodiments, also in this embodiment, the optical pickup device can be simplified in arrangement and miniaturized in size, by which the recording and reproducing apparatus can be simplified in arrangement and miniaturized in size.

Figure 20:
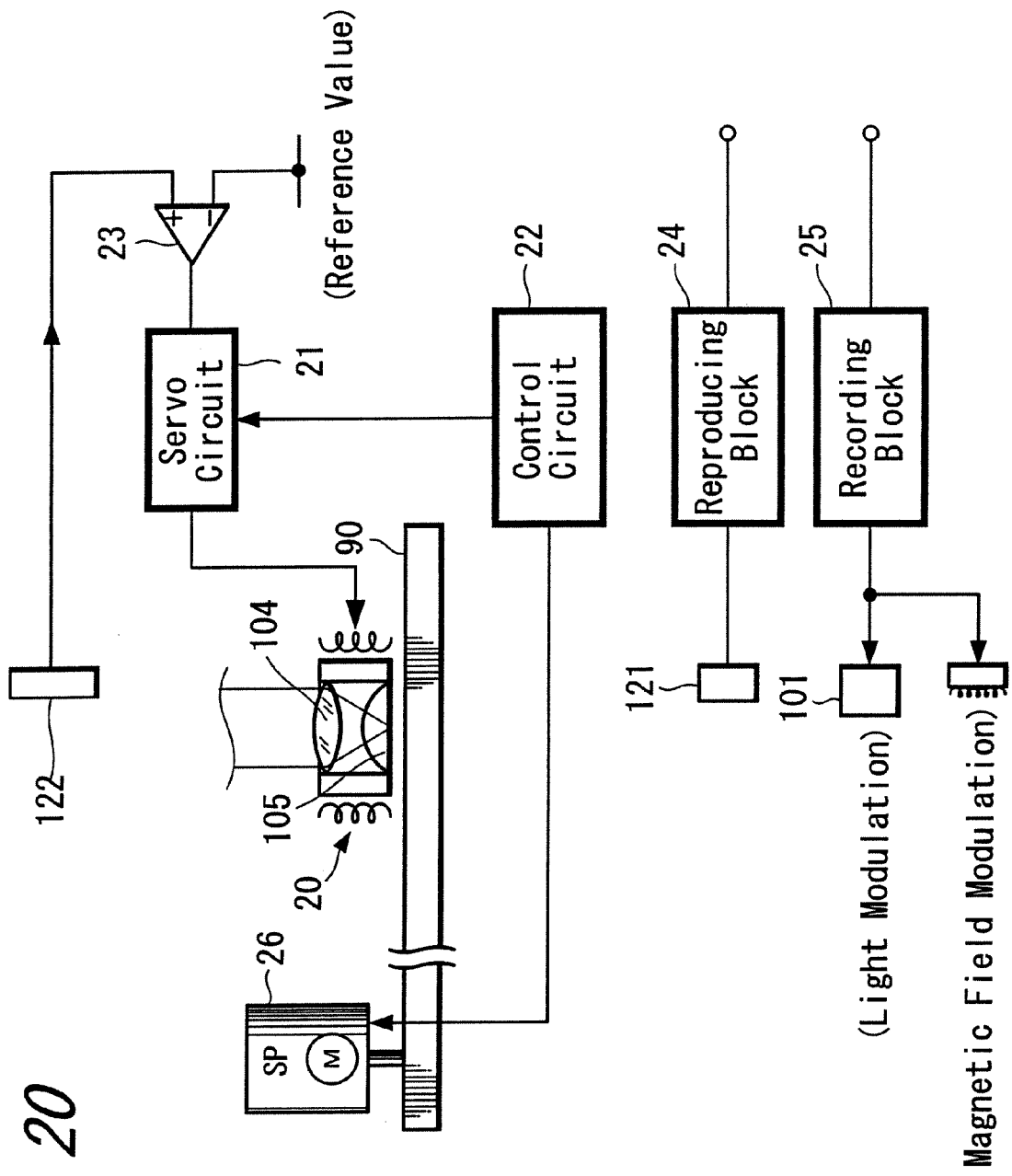
FIG. 20 is a block diagram showing an example of an arrangement of a servo system that is applicable to the first, second and third embodiments of the present invention.

A servo mechanism for servo-controlling the position of the optical system when the optical recording and reproducing medium is recorded or reproduced with application of the optical pickup devices of the above-mentioned respective embodiments will be described with reference to FIG. 20. When the optical recording medium such as an optical disk and a magneto-optical disk is recorded or reproduced by using the optical pickup device, the positions of suitable assemblies such as a lens should be servo-controlled by using a servo mechanism. Particularly, this example requires a servo mechanism by which a distance between the surface of the optical recording medium 90 and the flat surface portion of the solid immersion lens 105 can be held at a predetermined distance. As shown in FIG. 20, this servo mechanism includes a coil 20 serving as a means for moving the solid immersion lens 105 in the direction perpendicular to the surface of the optical recording medium 90, a servo circuit 21 and a control circuit 22 serving as a control means for controlling this servo circuit 21. The servo circuit 21 is able to set the distance between the surface of the optical recording medium 90 and the flat surface portion of the solid immersion lens 105 to the state instructed by the control circuit 22 in response to a signal applied to the coil 20.

The control circuit 22 supplies a command to the servo circuit 21 so as to maintain the light intensity of the gap error signal, detected by the gap error signal detecting unit 122 of the photo-detector 120 (in the case of the first embodiment), at predetermined light intensity, thereby maintaining a constant distance between the surface of the optical recording medium 90 and the flat surface portion of the solid immersion lens 105. Herein, the solid immersion lens 105 can be controlled in position in unison with the objective lens 104 by the coil 20.

To maintain the light intensity detected by the photo-detector 122 at predetermined intensity, the output signal from the photo-detector 122, for example, is compared with a predetermined reference value. This reference value can be determined by the following first, second and third processing, for example.

The first processing is such one that a mean value between an output value outputted from the gap error signal detecting unit 122 when the surface of the optical recording medium 90 and the flat surface portion of the solid immersion lens 105 are in close contact with each other (distance therebetween is zero) and an outputted value outputted from the gap error signal detecting unit 122 when a distance between the surface of the optical recording medium 90 and the flat surface portion of the solid immersion lens 105 is sufficiently large is set to a reference value. In the second processing, a distance between the surface of the optical recording medium 90 and the flat surface portion of the solid immersion lens 105 is measured, correlation between this measured value and the outputted value from the gap error signal detecting unit 122 is calculated, whereafter an outputted value corresponding to a predetermined distance is specified and set to a reference value. Further, the third processing is such one that ½ of the value outputted from the gap error signal detecting unit 122 when the distance between the surface of the optical recording medium 90 and the flat surface portion of the solid immersion lens 105 is sufficiently large is set to a reference value. Any one of the first, second and third processing may be applied to the present invention.

As shown in FIG. 20, the output from the RF signal detecting unit (detecting unit 121 in the first embodiment) of the photo-detector (photo-detector 120 in the first embodiment) is supplied to a reproducing block 24, in which it is processed by reproducing processing to thereby making it possible to reproduce information from the optical recording medium 90. When information is recorded on the optical recording medium 90, record processing can be carried out by generating a drive signal for driving the semiconductor laser 101 (in the case of the recording medium in which information is recorded by using pits or phase-change) or a drive signal for driving a magnetic field modulation coil (in the case of a magneto-optical recording medium) based upon a signal that has been processed by a recording block 25. The servo circuit 21 is not limited to the above-mentioned servo-control operation for servo-controlling the distance between the surface of the optical recording medium 90 and the flat surface portion of the solid immersion lens 105 and it may servo-control a spindle motor 26 that rotates the optical recording medium 90.

The present invention is not limited to the above-mentioned embodiments and may take various arrangements without departing from the gist of the present invention. By way of example, as the dividing means for dividing the incident light into the p-polarized light wave and the s-polarized light wave, there can be used other dividing means than the Wollaston prism, the Glan-Thompson prism and the polarizing and dividing grating in the above-mentioned first, second and third embodiments. Even when the polarizing and dividing grating is in use, there can be used a polarizing and dividing grating composed of other crystal structure than the crystal structure that has been referred to in the above-mentioned embodiments. Furthermore, the servo mechanism is not limited to the above-mentioned servo mechanism having the arrangement shown in FIG. 20 and may be modified as a servo mechanism for driving a suitable component such as a solid immersion lens.

According to the present invention, since the beam splitter reflects both of the p-polarized light component and the s-polarized light component, the p-polarized light component and the s-polarized light component reflected by this beam splitter are divided from each other and the light intensity of one of the divided polarized light component is detected, it becomes possible to detect the distance between the flat surface portion of the solid immersion lens and the surface of the optical recording medium by the simple and efficient arrangement.

In this case, since the Wollaston prism, the Glan-Thompson prism or the polarizing and dividing grating is used as the dividing means, for example, the p-polarized light component and the s-polarized light component can be divided from each other by the simple arrangement, and hence it becomes possible to individually detect the p-polarized light component and the s-polarized light component.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical pickup device including a condenser lens composed of a solid immersion lens having a spherical surface portion and a flat surface portion parallel to the surface of an optical recording medium, said condenser lens having a numerical aperture greater than 1, a bundle of rays in a predetermined polarized state being irradiated on said optical recording medium from a light source through said condenser lens and a polarized state component perpendicular to the polarized state of reflected light obtained when a distance between the surface of said optical recording medium and the flat surface portion of said solid immersion lens is zero is detected from reflected light from said optical recording medium to obtain a signal corresponding to the distance between the surface of said optical recording medium and the flat surface portion of said solid immersion lens, comprising:

a beam splitter configured to reflect both of a p-polarized light component and an s-polarized light component in reflected lights from said optical recording medium;

a divider configured to divide incident light into the p-polarized light component and the s-polarized light component reflected by said beam splitter; and a photo-detector configured to separately detect the p-polarized light component and the s-polarized light component separated by said divider.

2. An optical pickup device according to claim 1, wherein said divider is a Wollaston prism.

3. An optical pickup device according to claim 1, wherein said divider is a Glan-Thompson prism.

4. An optical pickup device according to claim 1, wherein said divider is a polarizing and dividing grating.

5. A recording and reproducing apparatus for recording and/or reproducing an optical recording medium by using an optical pickup device including a condenser lens composed of a solid immersion lens having a spherical surface portion and a flat surface portion parallel to the surface of said optical recording medium, the condenser lens having a numerical aperture greater than 1, said optical pickup device comprising a beam splitter configured to reflect both of a p-polarized light component and an s-polarized light component in reflected lights from said optical recording medium, a divider configured to divide the p-polarized light component and the s-polarized light component reflected by said beam splitter, and a photo-detector configured to separately detect the p-polarized light component and the s-polarized light component divided by said divider, comprising:
- a drive unit configured to adjust a distance between said optical recording medium and said flat surface portion of said solid immersion lens; and
- a controller configured to control the adjustment state of said drive unit based upon a detected signal obtained when light intensity of one polarized component detected by said photo-detector is detected as a signal corresponding to the distance between the surface of said optical recording medium and the flat surface portion of said solid immersion lens.

6. A recording and reproducing apparatus according to claim 5, further comprising:
- a reproducer configured to reproduce information from said optical recording medium based upon the other polarized light component detected by said photo-detector.

* * * * *